US012358543B2

(12) United States Patent
Malde et al.

(10) Patent No.: US 12,358,543 B2
(45) Date of Patent: Jul. 15, 2025

(54) TIME-SPACE NETWORK BASED MULTI-OBJECTIVE SYSTEMS AND METHODS FOR OPTIMAL RAIL CAR STACKING AT A RAILROAD MERCHANDISE YARD

(71) Applicant: BNSF Railway Company, Fort Worth, TX (US)

(72) Inventors: Avnish Kishor Malde, Fort Worth, TX (US); Paul Kuhn, Fort Worth, TX (US); Chad Lawrence, Fort Worth, TX (US); Nathaniel W. Merry, Kansas City, MO (US); Shane Reffett, Abingdon, IL (US); Patrick J. Sbrocca, Fort Worth, TX (US); Timothy J. Worrell, Monmouth, IL (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 18/673,181

(22) Filed: May 23, 2024

(65) Prior Publication Data
US 2024/0317285 A1 Sep. 26, 2024

(51) Int. Cl.
*B61L 27/16* (2022.01)
*B61L 17/02* (2006.01)
*G06Q 10/0631* (2023.01)

(52) U.S. Cl.
CPC ............ *B61L 27/16* (2022.01); *B61L 17/023* (2013.01); *G06Q 10/06313* (2013.01)

(58) Field of Classification Search
CPC ....................................... B61L 27/16
See application file for complete search history.

(56) References Cited

U.S. PATENT DOCUMENTS 2,910,578 A 10/1959 Karlet et al.
3,861,316 A 1/1975 Yamazaki et al.
(Continued)

FOREIGN PATENT DOCUMENTS

CA 2395821 A1 * 7/2001 ............. B61L 17/00
CA 2577556 A1 * 5/2008 ............. B61L 17/00
(Continued)

OTHER PUBLICATIONS

Gabrio Caimi, Leo Kroon, Christian Liebchen, Models for Railway Timetable Optimization: Applicability and Applications in Practice, Journal of Rail Transport Planning & Management, Aug. 30, 2015. (Year: 2015).*

(Continued)

*Primary Examiner* — Kurtis Gills
(74) *Attorney, Agent, or Firm* — Whitaker Chalk Swindle & Schwartz PLLC; Enrique Sanchez, Jr.; Juan Vasquez

(57) ABSTRACT

A method for assigning train blocks at a railroad merchandise yard includes determining, using a first optimization model and outbound train schedule data, a first list of train block assignments for a planning horizon. The method further includes determining whether an unassigned train block volume from the first optimization model is greater than zero. The method further includes displaying the first list of train block assignments generated by the first optimization model on an electronic display in response to determining that the unassigned train block volume from the first optimization model is not greater than zero. The method further includes, in response to determining that the unassigned train block volume from the first optimization model is greater than zero: determining and then displaying on the electronic display a second list of train block assignments for the planning horizon using a second optimization model and the outbound train schedule data.

20 Claims, 14 Drawing Sheets

(56) References Cited

U.S. PATENT DOCUMENTS

| | | | |
|---|---|---|---|
| 3,944,986 | A | 3/1976 | Staples |
| 4,610,206 | A | 9/1986 | Kubala et al. |
| 6,418,854 | B1 | 7/2002 | Kraft |
| 6,832,204 | B1* | 12/2004 | Doner ............ G06Q 10/063116 |
| | | | 701/19 |
| 6,856,865 | B2 | 2/2005 | Hawthorne |
| 6,961,682 | B2 | 11/2005 | Doner |
| 7,657,349 | B2 | 2/2010 | Hawthorne |
| 7,747,362 | B2 | 6/2010 | Muinonen et al. |
| 7,813,846 | B2 | 10/2010 | Wills et al. |
| 7,937,193 | B2 | 5/2011 | Philp et al. |
| 8,256,353 | B1 | 9/2012 | Howell |
| 9,145,151 | B2 | 9/2015 | Dierkes et al. |
| 2007/0005200 | A1* | 1/2007 | Wills ..................... G06Q 50/40 |
| | | | 701/19 |
| 2009/0072096 | A1 | 3/2009 | Ottow |
| 2015/0066561 | A1* | 3/2015 | Wills ............... G06Q 10/06314 |
| | | | 705/7.23 |
| 2022/0262249 | A1* | 8/2022 | Hayashi ................. G08G 1/127 |
| 2023/0281527 | A1* | 9/2023 | Cella ...................... G06V 20/17 |
| | | | 705/7.17 |

FOREIGN PATENT DOCUMENTS

| | | |
|---|---|---|
| EP | 0697321 B1 | 3/1999 |
| EP | 2595853 B1 | 5/2014 |
| EP | 3623257 B1 | 3/2021 |
| RU | 2767403 C1 | 3/2022 |
| WO | 2023097840 A1 | 6/2023 |

OTHER PUBLICATIONS

Shift2Rail, Yard Optimization Algorithm, Network Decision-Support Tool and Integration Framework, OptiYard, Jun. 25, 2019, 56 pages.

Wabtec, Yard Planner, May 2, 2023.

PST, Railyard Automation and Management, Apr. 21, 2021.

* cited by examiner

TIME-SPACE NETWORK BASED MULTI-OBJECTIVE SYSTEMS AND METHODS FOR OPTIMAL RAIL CAR STACKING AT A RAILROAD MERCHANDISE YARD

TECHNICAL FIELD

This disclosure generally relates to railroad yards, and more specifically to time-space network based multi-objective systems and methods for optimal rail car stacking at a railroad merchandise yard.

BACKGROUND

A typical train is composed of one or more locomotives (sometimes referred to as engines) and one or more railcars being pulled and/or pushed by the one or more engines. Trains are typically assembled in a railroad classification yard. In typical operations of a classification yard, hundreds or thousands of railcars are moved through classification tracks to route each of the railcars to a respectively assigned track, where the railcars are ultimately coupled to their assigned train based upon the train's route and final destination. Once the train is fully assembled, the train then departs the railyard and travels to its destination.

To assemble an outbound train, railcars are decoupled from incoming trains and sorted or "humped" to various classification tracks of a railroad classification "hump" yard. Typically, each railcar is assigned to a specific train block (i.e., a label based on destination, car type, etc.), and each classification track holds only the railcars having a common train block label. However, in some circumstances, multiple different train blocks must be assigned to the same classification track. This practice is known as "stacking" of railcars or blocks. The process of assigning blocks, including stacking and swing operations, from incoming trains to classification tracks in a hump yard is typically a manual process. For example, users known as Trainmasters and in some cases, Yardmasters must determine which blocks to assign to which classification tracks in a hump yard, how train blocks are stacked on the classification tracks, and how to perform swing operations. The manual decisions about the stacking and swinging of train blocks from incoming trains to specific classification tracks is a complex process that often leads to inefficient and suboptimal decisions.

SUMMARY

The present disclosure achieves technical advantages as systems, methods, and computer-readable storage media for providing optimal rail car assignment and stacking at a railroad merchandise yard. The present disclosure provides for a system integrated into a practical application with meaningful limitations that may include generating and displaying on an electronic display, using stored outbound train schedule data and a first optimization model, a first list of train block assignments for a planning horizon. Other meaningful limitations of the system integrated into a practical application include: determining whether an unassigned train block volume from the first optimization model is greater than zero; determining, using a second optimization model and the outbound train schedule data, a second list of train block assignments for the planning horizon; and displaying the second list of train block assignments generated by the second optimization model on the electronic display.

The present disclosure solves the technological problem of a lack of technical functionality for assigning train blocks at a railroad merchandise yard by providing methods and systems that provide functionality for optimally assigning train blocks (including stacking and swing operations) at a railroad merchandise yard over a planning horizon. The technological solutions provided herein, and missing from conventional systems, are more than a mere application of a manual process to a computerized environment, but rather include functionality to implement a technical process to supplement current manual solutions for assigning train blocks at a railroad merchandise yard by providing a mechanism for optimally and automatically assigning train blocks at a railroad merchandise yard. In doing so, the present disclosure goes well beyond a mere application the manual process to a computer.

Unlike existing solutions where personnel may be required to manually assign train blocks to classification tracks at a railroad merchandise yard, embodiments of this disclosure provide systems and methods that provide functionality for optimally assigning train blocks to classification tracks at a railroad merchandise yard. By providing optimized train block to track assignments for a railyard, the efficiency of railroad switching operations may be increased and availability/efficiency of the railroad track may be increased. For example, the time required to form an outbound train may be greatly decreased, the number of switching operations may be decreased, the switching distance may be decreased, and the amount of fuel required for switching operations may be decreased. Other technical advantages will be readily apparent to one skilled in the art from the following figures, descriptions, and claims. Moreover, while specific advantages have been enumerated above, various embodiments may include all, some, or none of the enumerated advantages.

In some embodiments, the disclosed models are formulated or otherwise configured to utilize various constraints and objectives in order to perform or execute a designated task (e.g., one or more features for train block assignment optimization, in accordance with one or more embodiments of the present disclosure). In other embodiments, the present disclosure includes techniques for implementing and training models (e.g., machine-learning models, artificial intelligence models, algorithmic constructs, optimizers, etc.) for performing or executing a designated task or a series of tasks (e.g., one or more features for train block assignment optimization, in accordance with one or more embodiments of the present disclosure). In these embodiments, the disclosed techniques provide a systematic approach for the training of such models to enhance performance, accuracy, and efficiency in their respective applications. In embodiments, the techniques for training the models can include collecting a set of data from a database, conditioning the set of data to generate a set of conditioned data, and/or generating a set of training data including the collected set of data and/or the conditioned set of data.

In some embodiments, a model can undergo a training phase wherein the model may be exposed to the set of training data, such as through an iterative processes of learning in which the model adjusts and optimizes its parameters and algorithms to improve its performance on the designated task or series of tasks. This training phase may configure the model to develop the capability to perform its intended function with a high degree of accuracy and efficiency. In embodiments, the conditioning of the set of data may include modification, transformation, and/or the application of targeted algorithms to prepare the data for training. The conditioning step may be configured to ensure that the set of data is in an optimal state for training the model, resulting in an enhancement of the effectiveness of the model's learning process. These features and techniques not only qualify as patent-eligible features but also introduce substantial improvements to the field of computational modeling. These features are not merely theoretical but represent an integration of a concepts into practical applications that significantly enhance the functionality, reliability, and efficiency of the models developed through these processes.

In embodiments, the present disclosure includes techniques for generating a notification of an event (e.g., an output notification, a user notification, etc.) that includes generating an alert that includes information specifying the location of a source of data associated with the event, formatting the alert into data structured according to an information format, and transmitting the formatted alert over a network to a device associated with a receiver based upon a destination address and a transmission schedule. In embodiments, receiving the alert enables a connection from the device associated with the receiver to the data source over the network when the device is connected to the source to retrieve the data associated with the event and causes a viewer application (e.g., a graphical user interface (GUI)) to be activated to display the data associated with the event. These features represent patent eligible features, as these features amount to significantly more than an abstract idea.

Such features, when considered as an ordered combination, amount to significantly more than simply organizing and comparing data. The features address the Internet-centric challenge of alerting a receiver with time sensitive information. This is addressed by transmitting the alert over a network to activate the viewer application, which enables the connection of the device of the receiver to the source over the network to retrieve the data associated with the event. These are meaningful limitations that add more than generally linking the use of an abstract idea (e.g., the general concept of organizing and comparing data) to the Internet, because they solve an Internet-centric problem with a solution that is necessarily rooted in computer technology. These features, when taken as an ordered combination, provide unconventional steps that confine the abstract idea to a particular useful application. Therefore, these features represent patent eligible subject matter.

Moreover, in embodiments, one or more operations and/or functionality of components described herein can be distributed across a plurality of computing systems (e.g., personal computers (PCs), user devices, servers, processors, etc.), such as by implementing the operations over a plurality of computing systems. This distribution can be configured to facilitate the optimal load balancing of requests, which can encompass a wide spectrum of network traffic or data transactions. By leveraging a distributed operational framework, a system implemented in accordance with embodiments of the present disclosure can effectively manage and mitigate potential bottlenecks, ensuring equitable processing distribution and preventing any single device from shouldering an excessive burden. This load balancing approach significantly enhances the overall responsiveness and efficiency of the network, markedly reducing the risk of system overload and ensuring continuous operational uptime. The technical advantages of this distributed load balancing can extend beyond mere efficiency improvements. It introduces a higher degree of fault tolerance within the network, where the failure of a single component does not precipitate a systemic collapse, markedly enhancing system reliability.

Additionally, this distributed configuration promotes a dynamic scalability feature, enabling the system to adapt to varying levels of demand without necessitating substantial infrastructural modifications. The integration of advanced algorithmic strategies for traffic distribution and resource allocation can further refine the load balancing process, ensuring that computational resources are utilized with optimal efficiency and that data flow is maintained at an optimal pace, regardless of the volume or complexity of the requests being processed. Moreover, the practical application of these disclosed features represents a significant technical improvement over traditional centralized systems. Through the integration of the disclosed technology into existing networks, entities can achieve a superior level of service quality, with minimized latency, increased throughput, and enhanced data integrity. The distributed approach of embodiments not only bolster the operational capacity of computing networks but offer a robust framework for the development of future technologies, underscoring its value as a foundational advancement in the field of network computing.

Further, to aid in the load balancing, the computing system can spawn multiple processes and threads to process data concurrently. The speed and efficiency of the computing system can be greatly improved by instantiating more than one process or thread to implement the claimed functionality. However, one skilled in the art of programming will appreciate that use of a single process or thread can also be utilized and is within the scope of the present disclosure.

Accordingly, the present disclosure discloses concepts inextricably tied to computer technology such that the present disclosure provides the technological benefit of implementing functionality to provide efficient and optimized train block to track assignments for a railyard over an upcoming planning horizon. The systems and techniques of embodiments provide improved systems by providing capabilities to perform functions that are currently performed manually and to perform functions that are currently not possible.

In one particular embodiment, a system includes one or more memory units configured to store outbound train schedule data. The system further includes one or more computer processors communicatively coupled to the one or more memory units. The one or more computer processors are configured to access the outbound train schedule data. The one or more computer processors are further configured to determine, using a first optimization model and the outbound train schedule data, a first list of train block assignments for a planning horizon. The one or more computer processors are further configured to determine whether an unassigned train block volume from the first optimization model is greater than zero after determining the first list of train block assignments using the first optimization model. The one or more computer processors are further configured to display the first list of train block assignments generated by the first optimization model on an electronic display in response to determining that the unassigned train block volume from the first optimization model is not greater than zero. In response to determining that the unassigned train block volume from the first optimization model is greater than zero, the one or more computer processors are further configured to: determine, using a second optimization model and the outbound train schedule data, a second list of train block assignments for the planning horizon; and display the second list of train block assignments generated by the second optimization model on the electronic display. The first and second lists of train block assignments each include a plurality of classification tracks of a classification bowl, a plurality of time periods of the planning horizon, and one or more of a plurality of train blocks that are assigned to each classification track for each time period of the planning horizon.

In another embodiment, a method for assigning train blocks at a railroad merchandise yard includes accessing outbound train schedule data. The method further includes determining, using a first optimization model and the outbound train schedule data, a first list of train block assignments for time periods of a planning horizon. The method further includes determining whether an unassigned train block volume from the first optimization model is greater than zero after determining the first list of train block assignments using the first optimization model. The method further includes displaying the first list of train block assignments generated by the first optimization model on an electronic display in response to determining that the unassigned train block volume from the first optimization model is not greater than zero. In response to determining that the unassigned train block volume from the first optimization model is greater than zero, the method further includes: determining, using a second optimization model and the outbound train schedule data, a second list of train block assignments for time periods of the planning horizon; and displaying the second list of train block assignments generated by the second optimization model on the electronic display. The first and second lists of train block assignments each include a plurality of classification tracks of a classification bowl, a plurality of time periods of the planning horizon, and one or more of a plurality of train blocks that are assigned to each classification track for each time period of the planning horizon.

In another embodiment, one or more computer-readable non-transitory storage media embodies instructions that, when executed by a processor, cause the processor to perform operations that include accessing outbound train schedule data. The operations further include determining, using a first optimization model and the outbound train schedule data, a first list of train block assignments for a planning horizon. The operations further include determining whether an unassigned train block volume from the first optimization model is greater than zero after determining the first list of train block assignments using the first optimization model. The operations further include displaying the first list of train block assignments generated by the first optimization model on an electronic display in response to determining that the unassigned train block volume from the first optimization model is not greater than zero. In response to determining that the unassigned train block volume from the first optimization model is greater than zero, the operations further include: determining, using a second optimization model and the outbound train schedule data, a second list of train block assignments for the planning horizon; and displaying the second list of train block assignments generated by the second optimization model on the electronic display. The first and second lists of train block assignments each include a plurality of classification tracks of a classification bowl, a plurality of time periods of the planning horizon, and one or more of a plurality of train blocks that are assigned to each classification track for each time period of the planning horizon.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying drawings, in which.

Figure 1:
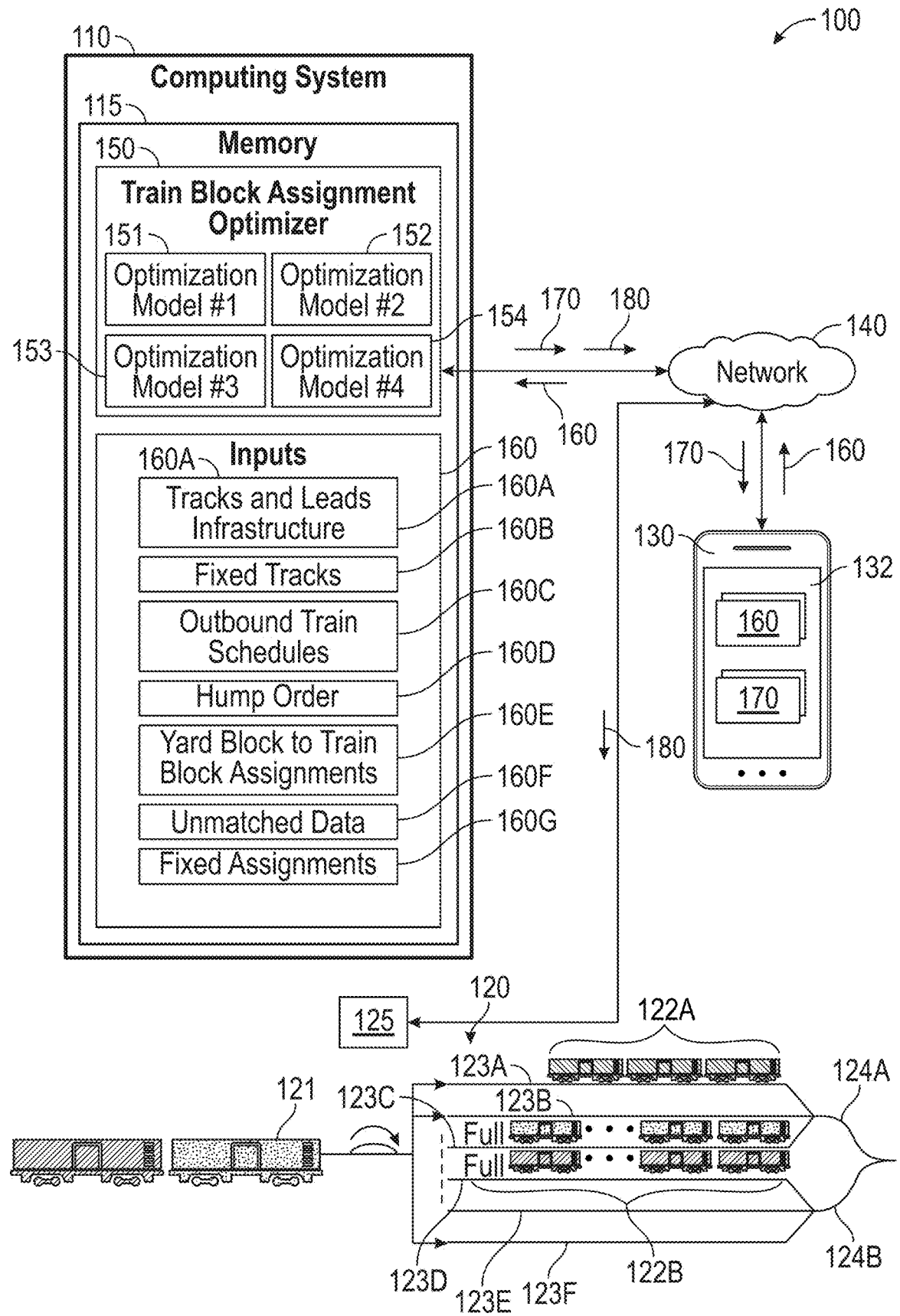
FIG. 1 is a diagram illustrating a train block stacking optimization system 100, according to particular embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

A typical train is composed of one or more locomotives (sometimes referred to as engines) and one or more railcars being pulled and/or pushed by the one or more engines. Trains are typically assembled in a railroad classification yard. In typical operations of a classification yard, hundreds or thousands of railcars are moved through classification tracks to route each of the railcars to a respectively assigned track, where the railcars are ultimately coupled to their assigned train based upon the train's route and final destination. Once the train is fully assembled, the train then departs the railyard and travels to its destination.

To assemble an outbound train, railcars are decoupled from incoming trains and sorted to various classification tracks of a railroad classification "hump" yard. Typically, each railcar is assigned to a specific train block (i.e., a label based on destination, car type, etc.), and each classification track holds only the railcars having a common train block label. However, in some circumstances, multiple different train blocks must be assigned to the same classification track. This practice is known as "stacking" of railcars or blocks. In other circumstances, the total available track length of a classification track may be less than the volume (i.e., total length) of the train blocks assigned to that classification track. Thus, some of the railcars of the assigned train block must be moved or parked on a nearby classification track. This practice is known as a "swing" operation. The process of assigning blocks, including stacking and swing operations, from incoming trains to classification tracks in a hump yard is typically a manual process. For example, users known as Trainmasters and in some cases, Yardmasters must determine which blocks to assign to which classification tracks in a hump yard, how train blocks are stacked on the classification tracks, and how to perform swing operations. The manual decisions about the stacking and swinging of train blocks from incoming trains to specific classification tracks is a complex process that often leads to inefficient and suboptimal decisions.

To address these and other problems with assigning train blocks from incoming trains to specific classification tracks, the disclosed embodiments provide time-space network based multi-objective systems and methods for optimally assigning train blocks at a railroad merchandise yard. In some embodiments, the disclosed systems and methods utilize up to four different optimization models to optimally assign train blocks at a railroad merchandise yard while attempting to simultaneously satisfy multiple objectives.

FIG. 1 is a diagram illustrating a train block stacking optimization system 100, according to particular embodiments. Train block stacking optimization system 100 includes a computing system 110, a client system 130, and a network 140. Client system 130 is communicatively coupled with computing system 110 using any appropriate wired or wireless communication system or network (e.g., network 140). Client system 130 includes an electronic display for displaying a user interface 132. User interface 132 displays various information and user-selectable elements that permit a user to provide one or more optimization model inputs 160 to train block stacking optimizer 150 executed by computing system 110 and to view one or more optimization model outputs 170 generated by train block stacking optimizer 150. Optimization model outputs 170 provided by train block stacking optimizer 150 may be used to provide optimal stacking and swing operations of train blocks 122 (e.g., 122A and 122B) onto classification tracks 123 (e.g., 123A-123F) of classification yard 120, as described in more detail herein. In some embodiments, computing system 110 electronically communicates one or more switching signals 180 (e.g., either wired or wirelessly) to hump yard switching equipment 125 to automatically sort train blocks 122 to classification tracks 123 according to optimization model outputs 170 of train block stacking optimizer 150.

In general, train block stacking optimization system 100 utilizes train block stacking optimizer 150 to provide optimization model outputs 170 (i.e., a planning horizon chart 170A and a train block volume chart 170B) for providing optimal stacking and swing operations of train blocks 122 (e.g., 122A and 122B) onto classification tracks 123 (e.g., 123A-123F) of classification yard 120. To do so, some embodiments of train block stacking optimizer 150 utilizes up to four different optimization models: a first optimization model 151 a second optimization model 152, a third optimization model 153, and a fourth optimization model 154. Train block stacking optimizer 150 may first utilize first optimization model 151 to determine a first list of assignments for train blocks 122 to classification tracks 123 of classification yard 120 (e.g., a classification bowl) for a planning horizon. The planning horizon may be any appropriate future time period that is divided into predetermined time blocks (e.g., one-hour blocks of time for the next upcoming ten hours). The first optimization model 151 may be configured to assign a maximum of one train block 122 per classification track 123 (i.e., no stacking of train blocks 122). If the solution from first optimization model 151 includes an unassigned train block volume that is zero (e.g., all train blocks 122 have been assigned to classification tracks 123), the results of first optimization model 151 may be utilized and/or displayed on client system 130 (e.g., using a notification). However, if the solution from first optimization model 151 includes an unassigned train block volume that is greater than zero (e.g., not all train blocks 122 have been assigned to classification tracks 123), train block stacking optimizer 150 may use second optimization model 152 to generate optimization model outputs 170. Second optimization model 152 may be configured to assign a maximum of two train blocks 122 per classification track 123 (i.e., stacking is permitted), as discussed in more detail herein.

In some embodiments, if the solution from second optimization model 152 includes an unassigned train block volume that is zero (e.g., all train blocks 122 have been assigned to classification tracks 123), results of second optimization model 152 may be utilized and/or displayed on client system 130. However, if the solution from second optimization model 152 includes an unassigned train block volume that is greater than zero (e.g., not all train blocks 122 have been assigned to classification tracks 123), train block stacking optimizer 150 may then use third optimization model 153 to generate optimization model outputs 170. Third optimization model 153 may be configured to assign a maximum of two train blocks 122 per classification track 123 (i.e., stacking is permitted), as discussed in more detail herein. In addition, third optimization model 153 may adjust weights of various objectives as described herein in order to place more emphasis on reducing unassigned volume of train blocks 122.

In some embodiments, if the solution from third optimization model 153 includes an unassigned train block volume that is zero (e.g., all train blocks 122 have been assigned to classification tracks 123), results of third optimization model 153 may be utilized and/or displayed on client system 130. However, if the solution from third optimization model 153 includes an unassigned train block volume that is still greater than zero (e.g., not all train blocks 122 have been assigned to classification tracks 123), train block stacking optimizer 150 may then use fourth optimization model 154 to generate optimization model outputs 170. Fourth optimization model 154 may be configured to assign a maximum of two train blocks 122 per classification track 123 (i.e., stacking is permitted), as discussed in more detail herein. In addition, third optimization model 153 may allow for "bad stacking" solutions, as discussed in more detail herein. As a result, stacking and swing operations of train blocks 122 to classification tracks 123 within classification yard 120 may be optimized and be more efficient than typical operations where a Trainmaster manually decides stacking and swing operations of train block 122 assignments within classification yard 120.

Computing system 110 may be any appropriate computing system in any suitable physical form. As example and not by way of limitation, computing system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computing system 110 may include one or more computer systems; be unitary or distributed; span multiple locations; span multiple machines; span multiple data centers; or reside in a cloud, which may include one or more cloud components in one or more networks. Where appropriate, computing system 110 may perform without substantial spatial or temporal limitation one or more steps of one or more methods described or illustrated herein. As an example, and not by way of limitation, computing system 110 may perform in real time or in batch mode one or more steps of one or more methods described or illustrated herein. Computing system 110 may perform at different times or at different locations one or more steps of one or more methods described or illustrated herein, where appropriate. A particular example of a computing system 110 is described in reference to FIG. 14.

Computing system 110 includes one or more memory units/devices 115 (collectively herein, "memory 115") that may store train block stacking optimizer 150 and optimization model inputs 160. Train block stacking optimizer 150 may be a software module/application utilized by computing system 110 to provide optimization model outputs 170 and switching signals 180 for efficiently providing swing and stacking operations of train blocks 122 to classification tracks 123 of classification yard 120, as described herein. Train block stacking optimizer 150 represents any suitable set of instructions, logic, or code embodied in a computer-readable storage medium. For example, train block stacking optimizer 150 may be embodied in memory 115, a disk, a CD, or a flash drive. In particular embodiments, train block stacking optimizer 150 may include instructions (e.g., a software application) executable by a computer processor to perform some or all of the functions described herein. In some embodiments, train block stacking optimizer 150 includes first optimization model 151, second optimization model 152, third optimization model 153, and fourth optimization model 154, which are described in more detail herein.

Classification yard 120 is a collection of connected railroad tracks for storing and sorting railcars 121. In some embodiments, classification yard 120 is a "hump" yard that is designed to classify railcars 121 into common train blocks 122. Classification yard 120 may be composed of various sub-yards that work together to facilitate the classification of railcars 121 into common train blocks 122 on classification tracks 123. For example, classification yard 120 may include a receiving yard, a hump, a bowl, multiple pull leads 124, and a departure yard. The receiving yard is a storage location for inbound trains and serves as a buffer for downstream processes. Inbound trains that need classification are broken up and prepared for sorting in the receiving yard. The hump works in concert with a series of automated switches and retarders (e.g., hump yard switching equipment 125) to allow gravity to direct railcars 121 to their desired locations in the bowl. The bowl includes multiple classification tracks 123. Each classification track 123 typically holds railcars 121 assigned to a single specific train block 122. The bowl helps sort railcars 121 into different classification tracks 123 based on their destination and acts as a holding location to allow time for the aggregation of block volume. Pull leads 124 are the track connections between the bowl and the departure yard. Yard crews will typically pull multiple classification tracks 123 from the bowl to build an outbound train and then move the outbound train to the departure yard. The pull leads 124 are where these railcars 121 are first combined to construct the outbound train. The departure yard acts as a staging location for an outbound train prior to departure from the terminal.

Railcar 121 is any possible type of railcar that may be coupled to a train. Block 122 is a group of railcars 121. In some embodiments, railcars 121 within a block 122 may originate from disparate origins and may be destined for disparate destinations. A block 122 originating from a location can be composed of railcars 121 whose final destinations are different and could have originated from different locations. When railcars 121 arrive to an intermediate rail-yard 120, the block 122 may be broken up and railcars 121 from different trains may be re-blocked based on train schedules.

Hump yard switching equipment 125 includes equipment or devices within classification yard 120 that direct train blocks 122 (i.e., railcars 121) to specific classification tracks 123. In some embodiments, hump yard switching equipment 125 includes automatic track switches and retarders that operate to switch railcars 121 onto specific classification tracks 123. In some embodiments, computing system 110 is electronically coupled to hump yard switching equipment 125 using any wired or wireless technology via network 140. In general, computing system 110 sends switching signals 180 to hump yard switching equipment 125 in order to automatically move train blocks 122 to their assigned classification tracks 123 according to optimization model outputs 170 of train block stacking optimizer 150.

Client system 130 is any appropriate user device for communicating with components of computing system 110 over network 140 (e.g., the internet). In particular embodiments, client system 130 may be an electronic device including hardware, software, or embedded logic components or a combination of two or more such components and capable of carrying out the appropriate functionalities implemented or supported by client system 130. As an example, and not by way of limitation, a client system 130 may include a computer system (e.g., computer system 1200) such as a desktop computer, notebook or laptop computer, netbook, a tablet computer, e-book reader, GPS device, camera, personal digital assistant (PDA), handheld electronic device, cellular telephone, smartphone, smartwatch, augmented/virtual reality device such as wearable computer glasses, other suitable electronic device, or any suitable combination thereof. This disclosure contemplates any suitable client system 130. A client system 130 may enable a network user at client system 130 to access network 140. A client system 130 may enable a user to communicate with other users at other client systems 130. Client system 130 may include an electronic display that displays graphical user interface 132, a processor such processor 1202, and memory such as memory 1204.

Network 140 allows communication between and amongst the various components of train block stacking optimization system 100. This disclosure contemplates network 140 being any suitable network operable to facilitate communication between the components of railcar switching optimization system 100. Network 140 may include any interconnecting system capable of transmitting audio, video, signals, data, messages, or any combination of the preceding. Network 140 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network.

Train block stacking optimizer 150 uses one or more optimization model inputs 160 to produce one or more optimization model outputs 170. Train block stacking optimizer 150 utilizes current inventory volume of an arrival yard (i.e., inventory of railcars 121 within the arrival yard) as an input rather than utilizing historical volume as a proxy. For example, train block stacking optimizer 150 analyzes the active inventory of railcars 121 in an arrival yard along with their assigned train-blocks and actual, real-time outbound train information (e.g., outbound train schedules 160C). Train block stacking optimizer 150 also analyzes current bowl inventory (i.e., railcars 121 within classification yard 120) to ensure that future recommendations align with current, actual conditions. Furthermore, train block stacking optimizer 150 utilizes active (e.g., real time) data to determine when a classification track 123 is expected to be pulled (i.e., railcars 121 removed from the classification track 123 to build an outbound train) and thus available for additional volume. Overall, train block stacking optimizer 150 makes recommendations over a given planning horizon time period and provides block-to-track assignments considering such factors as stacking of up to two train blocks 122 per classification track 123.

Train block stacking optimizer 150 is a multi-objective optimization model that considers interactions and constraints across classification yard 120, particularly regarding the arrival yard, classification yard 120, and pull leads 124. At a high level, train block stacking optimizer 150 is a sequential decision model that considers the decision made in the current time period to be propagated into future time periods, from the time the assignment was made when the first railcars 121 arrives until the train blocks 122 is pulled out of its classification track 123, for all outbound trains to be built considering the inventory of classification yard 120 and the arrival yard. In some embodiments, objectives of train block stacking optimizer 150 include one or more of: efficient utilization of bowl capacity, minimization of switch distance, and minimization of the number of trains spread across multiple pull leads 124. Each of these objectives is discussed in more detail below.

A first objective of some embodiments of train block stacking optimizer 150 is the efficient utilization of bowl capacity/volume (e.g., minimization of unassigned volume). The bowl of classification yard 120 has constraints in both the total amount of footage available (e.g., the total combined track length of classification tracks 123 within the bowl) and in the number of classification tracks 123 available. Some embodiments of train block stacking optimizer 150 minimize the amount of unassigned volume for the bowl. As an illustrative example, suppose that a first train block 122A has 2200 feet of expected traffic (i.e., the combined length of all railcars 121 that are assigned to the first train block 122A is 2200 feet). If classification track 123A that is 2000 feet in length is assigned to first train block 122A, then 200 feet is left unassigned. If one 2000-foot classification track 123 track and another 1000-foot classification track 123 is assigned to first train block 122A, then 0 feet first train block 122A is left unassigned while 800 track feet is expected to be left unutilized. If one 3000-foot classification track 123 is assigned to first train block 122A, then 0 feet of first train block 122A is left unassigned while 800 track feet is expected to be left unutilized. In this scenario, however, only one classification track 123 has been utilized and a second classification track 123 is available for another train block 122 (e.g., train block 122B). Some embodiments of train block stacking optimizer 150 search through and analyze these combinations for every train block 122 on all outbound trains that need to be built (based on arrival yard and inventory of classification yard 120) for every time period in the planning horizon in order to determine an outcome that accommodates all train blocks 122 while minimizing any unassigned/overflow volume. In some embodiments, the planning horizon may be any future time period (e.g., eight, ten hours, 24 hours, etc.), and each time period of the planning horizon is any division of the planning horizon (e.g., one hour, thirty minutes, etc.). The duration of both the planning horizon and time periods can be configured by the user.

A second objective of some embodiments of train block stacking optimizer 150 is the minimization of switch distance. In general, all train blocks 122 belonging to any given outbound train should be near one another in classification yard 120. For example, all railcars 121 belonging to the same train block 122 should be on the same classification track 123 or adjacent classification tracks 123 (e.g., all railcars 121 of train block 122A should be on classification track 123A and all railcars 121 of train block 122B should be on classification track 123D). Some embodiments of train block stacking optimizer 150 assign train blocks 122 such that the distance between common train blocks 122 belonging to the same outbound train is minimized.

A third objective of some embodiments of train block stacking optimizer 150 is to minimize the number of trains spread across multiple pull leads 124. For example, consider a scenario where a first outbound train carries train blocks 122A and train blocks 122B. To save resources such as time and energy, some embodiments of train block stacking optimizer 150 attempt to minimize or avoid having crews travel between different pull leads 124 to build the first outbound train by avoiding assigning train blocks 122A and train blocks 122B to two different pull leads 124.

In some embodiments, train block stacking optimizer 150 utilizes up to four different optimization models to generate optimization model outputs 170: first optimization model 151, second optimization model 152, third optimization model 153, and fourth optimization model 154. Example methods of utilizing first optimization model 151, second optimization model 152, third optimization model 153, and fourth optimization model 154 to generate one or more optimization model outputs 170 are discussed in more detail in reference to FIGS. 11-13. First optimization model 151, second optimization model 152, third optimization model 153, and fourth optimization model 154 are each is described in more detail below.

In some embodiments, train block stacking optimizer 150 utilizes first optimization model 151. In general, first optimization model 151 is configured to assign a maximum of one train block 122 per classification track 123 (i.e., no stacking of train blocks 122). In some embodiments, first optimization model 151 is formulated to meet the following objectives: minimize an amount of total distance a plurality of pull engines must travel to build a plurality of outbound trains; minimize a total number of outbound trains present in multiple pull leads 124; and minimize the volume of unassigned train blocks 122. In some embodiments, first optimization model 151 utilizes the set notations as shown in TABLE 1 below:

TABLE 1

Set Notations for First Optimization Model 151

I = Set of all blocks
i = Element of set I
J = Set of all tracks
j = Element of set J
j' = Element of set J
K = Sequence of all trains departing a station ordered by their departure time
k = An element of sequence K
$k_a$ = Element at index 'a' of sequence K
N = Set of all groups
n = element of set N
$\kappa_k$ = Set of blocks that belong to train 'k'
$i_k$ = An element of set $\kappa_k$
$v_n$ = Set of tracks that belong to group 'n'
$j_n$ = An element of set $v_n$
$t_{i_k}^s$ = Hump start period for block 'i' belonging to train 'k'
$t_{i_k}^e$ = Hump end period for block 'i' belonging to train 'k'
$t_{i_k}$ = Set of all periods for block 'i' belonging to train 'k' (i.e., $t_{i_k}^s, t_{i_k}^{s+1}, \ldots, t_{i_k}^{e-1}, t_{i_k}^e$)
$p_{i_k}$ = Pull period for block 'i' belonging to train 'k'

In some embodiments, first optimization model 151 utilizes the input parameters as shown in TABLE 2 below:

TABLE 2

Input Parameters for First Optimization Model 151

$B_{i_k, t}$ = Expected cumulative feet for block 'i' assigned to train 'k' humped by period 't'
$C_j$ = Maximum of track 'j'
$\delta_{j, t}$ = Unavailable track length of track 'j' in period 't'
$D_{j, j'}$ = Distance of track 'j' from track 'j''
M = Big – M
K = Fixed trains in same lead for consolidation opportunities
Λ = Fixed lead assignment
$\theta_f$ = Fixed track assignment In some embodiments, first optimization model 151 utilizes the decision variables as shown in TABLE 3 below:

TABLE 3

Decision Variables for First Optimization Model 151

$v_{i_k, j, t}$ = volume of block 'i' belonging to train 'k' assigned to track 'j' in period 't'
$u_{i_k, t}$ = Unassigned volume of block 'i' belonging to train 'k' in period 't'
$x_{i_k, j, t}$ = 1, if block 'i' belonging to train 'k' is assigned to track 'j' in period 't', otherwise 0
$r_{k, j, t}$ = 1, if train 'k' has any of its block on track 'j' in period 't', otherwise 0
$y_{j, j', k, t}$ = 1, if train 'k' has blocks on track 'j' and 'j'' in period 't', otherwise 0
$g_{k, n, t}$ = 1, if train 'k' as any of its block in group 'n' in period 't', otherwise 0
$\omega_{n, n', k, t}$ = 1, if train 'k' has blocks in group 'n' and 'n'' in period 't', otherwise 0

In some embodiments, first optimization model 151 is formulated to meet the following three objectives. First, first optimization model 151 may minimize an amount of total distance (e.g., in feet) that a plurality of pull engines must travel to build a plurality of outbound trains using the following formula:

$$\sum_{\forall t} \sum_{\forall k} \sum_{\forall j} \sum_{\forall j'} D_{j,j'} * y_{j,j',k,t}$$

Second, first optimization model 151 may minimize a total number of outbound trains present in multiple pull leads 124 using the following formula:

$$\sum_{\forall t} \sum_{\forall n \in N} \sum_{\forall n' \in N, n \neq n'} \sum_{\forall k} w_{k_a,k_b,n,t}$$

Third, first optimization model 151 may minimize a volume of unassigned train blocks 122 using the following formula:

$$\sum_{\forall t} \sum_{\forall i_k} u_{i_k,t}$$

In some embodiments, first optimization model 151 is subject to the items in the following list:

1. The total length of allocated classification tracks 123 to all train blocks 122 should be greater than the total length of train blocks 122:

$$\sum_{\forall j} v_{i_k,j,t} + u_{i_k,t} = B_{i_k,t} \ldots \forall i_k, t$$

2. The sum of the length of all train blocks 122 allocated to track 'j' in period 't', cannot be greater than the available track length for track 'j' in period 't':

$$\sum_{\forall i_k} v_{i_k,j,t} \leq C_j - \delta_{j,t} \ldots \forall j, t$$

3. If a block '$i_k$' is allocated some volume to a track 'j' in period 't', then $x_{i_k,j,t}=1$:

$$v_{i_k,j,t} - (M + \varepsilon) * x_{i_k,j,t} \leq 1 - \varepsilon \ldots \forall i_k, j, t$$

4. Only one train block 122 can be assigned to a single track in period 't':

$$\sum_{\forall i_k} x_{i_k,j,t} \leq 1 \ldots \forall j, t$$

5. Tracking the classification tracks 123 on which the train blocks 122 for a train 'k' are on:

$$r_{k,j,t} >= x_{i_k,j,t} \ldots \forall i_k \in \kappa_k, \forall j, k, t$$

6. Tracking the movement of pull engines travelled from track to track to build a train 'k':

$$y_{j,j',k,t} \geq r_{k,j,t} + r_{k,j',t} - 1 \ldots \forall j, j' \in J, \forall j' < j \& \forall k, t$$

$$y_{j,j',k,t} \leq r_{k,j,t} \ldots \forall j, j' \in J, \forall j' < j \& \forall k, t$$

$$y_{j,j',k,t} \leq r_{k,j',t} \ldots \forall j, j' \in J, \forall j' < j \& \forall k, t$$

7. Tracking the groups in which the train 'k' blocks are in:

$$g_{k,n,t} >= r_{k,j_n,t} \ldots \forall j_n \in v_n, \forall n \in N, \& \forall k$$

8. Keeping track of trains whose train blocks 122 are assigned to multiple pull leads 124:

$$w_{n,n',k,t} \geq g_{k,n,t} + g_{k,n',t} - 1 \ldots \forall n, n' \in N, n \neq n', \forall k, \forall t$$

$$w_{n,n',k,t} \leq g_{k,n,t} \ldots \forall n, n' \in N, n \neq n', \forall k, \forall t$$

$$w_{n,n',k,t} \leq g_{k,n',t} \ldots \forall n, n' \in N, n \neq n', \forall k, \forall t$$

9. Fixed pull lead 124 assignments:

$$g_{k_\alpha,n_\alpha,t} = 1 \ldots \forall k_\alpha, n_\alpha \in A, \forall t$$

10. Fixed classification track 123 assignments:

$$x_{i_k,j,t} = 1 \ldots \forall i_k, j \in \theta_f$$

In some situations, first optimization model 151 yields assignments for train blocks 122 that result in an unassigned volume of train blocks 122 that is greater than zero (i.e., not all train blocks 122 were assigned to classification tracks 123) due to first optimization model 151 being configured to not allow stacking of train blocks 122. In this situation, train block stacking optimizer 150 may utilize second optimization model 152 to begin stacking train blocks 122 on classification tracks 123. Second optimization model 152 is described in more detail below.

In some embodiments, train block stacking optimizer 150 utilizes second optimization model 152. In general, second optimization model 152 is configured to assign a maximum of two train blocks 122 per classification track 123 (i.e., stacking of a maximum of two train blocks 122 per classification track 123). In some embodiments, second optimization model 152 is formulated to meet the following objectives: minimize an amount of total distance a plurality of pull engines must travel to build a plurality of outbound trains; and minimize the volume of unassigned train blocks 122. In some embodiments, second optimization model 152 utilizes the set notations as shown in TABLE 4 below:

TABLE 4

Set Notations for Second Optimization Model 152

| |
|---|
| I = Set of all blocks |
| i = Element of set I |
| J = Set of all tracks |

TABLE 4-continued

Set Notations for Second Optimization Model 152 j = Element of set J
j' = Element of set J
K = Sequence of all trains departing a station ordered by their departure time
k = An element of sequence K
$k_a$ = Element at index 'a' of sequence K
N = Set of all groups
n = element of set N
$\kappa_k$ = Set of blocks that belong to train 'k'
$i_k$ = An element of set $\kappa_k$
$v_n$ = Set of tracks that belong to group 'n'
$j_n$ = An element of set $v_n$
$t_{i_k}^s$ = Hump start period for block 'i' belonging to train 'k'
$t_{i_k}^e$ = Hump end period for block 'i' belonging to train 'k'
$t_{i_k}$ = Set of all periods for block 'i' belonging to train 'k' (i.e., $t_{i_k}^s, t_{i_k}^{s+1}, \ldots, t_{i_k}^{e-1}, t_{i_k}^e$)
$p_{i_k}$ = Pull period for block 'i' belonging to train 'k'
$\omega_{i_k, t}$ = Set of blocks that can be assigned with block '$i_k$' in period 't' on same tracks as '$i_k$'
$i"_{k"}$ = An element of set $\omega_{i_k, t}$
Good Stacking Logic
$i"_{k"} \in \omega_{i_k, t}$, if either of the following condition is satisfied:
1.     The hump end time for $i"_{k"}$ ($t_{i"_{k"}}^e$), hump start time of $i_k$ ($t_{i_k}^s$) is $t_{i"_{k"}}^e \leq t_{i_k}^s$. And pull time for $i"_{k"}$ ($p_{i"_{k"}}$), pull time of $i_k$ ($p_{i_k}$) is $p_{i"_{k"}} \leq p_{i_k}$. Furthermore, $p_{i"_{k"}} \geq t_{i_k}^s$.
2.     The hump start time for $i"_{k"}$ ($t_{i"_{k"}}^s$), hump end time of $i_k$ ($t_{i_k}^e$) is $t_{i"_{k"}}^s \geq t_{i_k}^e$. And pull time for $i"_{k"}$ ($p_{i"_{k"}}$), pull time of $i_k$ ($p_{i_k}$) is $p_{i"_{k"}} \geq p_{i_k}$. Furthermore, $p_{i_k} \geq t_{i"_{k"}}^s$.
$\omega'_{i_k, t} = I - \omega_{i_k, t}$
$\omega'_{i_k, t}$, is the set of blocks that cannot be assigned to same tracks as '$i_k$' assigned in period 't'.

In some embodiments, second optimization model 152 utilizes the input parameters as shown in TABLE 5 below:

TABLE 5

Input Parameters for Second Optimization Model 152

$B_{i_k, t}$ = Expected cumulative feet for block 'i' assigned to train 'k' humped by period 't'
$C_j$ = Maximum of track 'j'
$\delta_{j, t}$ = Unavailable track length of track 'j' in period 't'
$D_{j, j'}$ = Distance of track 'j' from track 'j"
M = Big – M
K = Fixed trains in same lead for consolidation opportunities
$\Lambda$ = Fixed lead assignment
$\theta_f$ = Fixed track assignment In some embodiments, second optimization model 152 utilizes the decision variables as shown in TABLE 6 below:

TABLE 6

Decision Variables for Second Optimization Model 152

$v_{i_k, j, t}$ = volume of block 'i' belonging to train 'k' assigned to track 'j' in period 't'
$u_{i_k, t}$ = Unassigned volume of block 'i' belonging to train 'k' in period 't'
$x_{i_k, j, t}$ = 1, if block 'i' belonging to train 'k' is assigned to track 'j' in period 't', otherwise 0
$r_{k, j, t}$ = 1, if train 'k' has any of its block on track 'j' in period 't', otherwise 0
$y_{j, j', k, t}$ = 1, if train 'k' has blocks on track 'j' and 'j"' in period 't', otherwise 0
$g_{k, n, t}$ = 1, if train 'k'as any of its block in group 'n' in period 't', otherwise 0
$w_{n, n', k, t}$ = 1, if train 'k' has blocks in group 'n' and 'n"' in period 't', otherwise 0

In some embodiments, second optimization model 152 is formulated to meet the following two objectives. First, in some embodiments, second optimization model 152 minimizes an amount of total distance a plurality of pull engines must travel to build a plurality of outbound trains using the following formula:

$$\sum_{\forall t} \sum_{\forall k} \sum_{\forall j} \sum_{\forall j'} D_{j, j'} * y_{j, j', k, t}$$

Second, in some embodiments, second optimization model 152 minimizes a volume of unassigned train blocks 122 using the following formula:

$$\sum_{\forall t} \sum_{\forall i_k} u_{i_k, t}$$

In some embodiments, second optimization model 152 is subject to the items in the following list:

1. The length of allocated classification tracks 123 to all train blocks 122 should be greater than the length of train blocks 122:

$$\sum_{\forall j} v_{i_k, j, t} + u_{i_k, t} = B_{i_k, t} \ldots \forall i_k, t$$

2. The sum of the length of all train blocks 122 allocated to track 'j' in period 't', cannot be greater than the available track length for track 'j' in period 't':

$$\sum_{\forall i_k} v_{i_k,j,t} \leq C_j - \delta_{j,t} \ldots \forall j, t$$

3. If a block '$i_k$' is allocated some volume to a track 'j' in period 't', then $x_{i_k,j,t}=1$:

$$v_{i_k,j,t} - (M+\varepsilon) * x_{i_k,j,t} \leq 1 - \varepsilon \ldots \forall i_k, j, t$$

4. Stacking constraints:
   a. Assigned volume of the blocks '$i_k$' that cannot be stacked together with block 'ix' in period 't' is zero on any classification track 123 where block '$i_k$' is assigned:

$$\sum_{\forall i'_k \in \omega'_{i_k,t}} v_{i'_k,j,t} \leq M * (1 - x_{i_k,j,t}) \ldots \forall i_k, j, t$$

b. Stacking is allowed: up to two train blocks 122 can be assigned to a single classification track 123 in period 't':

$$\sum_{\forall i_k} x_{i_k,j,t} \leq 2 \ldots \forall j, t$$

5. Tracking the classification tracks 123 on which the train blocks 122 for a train 'k' are on:

$$r_{k,j,t} >= x_{i_k,j,t} \ldots \forall i_k \in \kappa_k, \forall j, k, t$$

6. Tracking the movement of pull engines travelled from track to track to build a train 'k':

$$y_{j,j',k,t} \geq r_{k,j,t} + \geq r_{k,j',t} - 1 \ldots \forall j, j' \in J, \forall j' < j \& \forall k, t$$

$$y_{j,j',k,t} \leq r_{k,j,t} \ldots \forall j, j' \in J, \forall j' < j \& \forall k, t$$

$$y_{j,j',k,t} \leq r_{k,j',t} \ldots \forall j, j' \in J, \forall j' < j \& \forall k, t$$

7. Tracking the groups in which the train 'k' blocks are in:

$$g_{k,n,t} >= t_{k,j_n,t} \ldots \forall j_n \in v_n, \forall n \in N, \& \forall k$$

8. Keeping track of trains whose train blocks 122 are assigned to multiple pull leads 124:

$$w_{n,n',k,t} \geq g_{k,n,t} + g_{k,n',t} - 1 \ldots \forall n, n' \in N, n \neq n', \forall k, \forall t$$

$$w_{n,n',k,t} \leq g_{k,n,t} \ldots \forall n, n' \in N, n \neq n', \forall k, \forall t$$

$$w_{n,n',k,t} \leq g_{k,n',t} \ldots \forall n, n' \in N, n \neq n', \forall k, \forall t$$

9. Fixed pull lead 124 assignments:

$$g_{k_\alpha,n_\alpha,t} = 1 \ldots \forall k_\alpha, n_\alpha \in A, \forall t$$

10. Fixed classification track 123 assignments:

$$x_{i_k,j,t} = 1 \ldots \forall i_k, j \in \theta_f$$

In some embodiments, second optimization model 152 is solved with a blended objective approach by assigning a weight to each of the two objectives above and adding them together. For example, some embodiments of second optimization model 152 may assign a greater weight to the first objective above for minimizing an amount of total distance a plurality of pull engines must travel to build a plurality of outbound trains. In other embodiments, second optimization model 152 may assign equal weights to the two objectives above.

In some situations, second optimization model 151 yields assignments for train blocks 122 that result in an unassigned volume of train blocks 122 that is greater than zero (i.e., not all train blocks 122 were assigned to classification tracks 123) in some time period of the planning horizon. In this situation, train block stacking optimizer 150 may utilize third optimization model 152. In some embodiments, third optimization model 153 is identical to second optimization model 152 except for assigning different weights to the two objectives of second optimization model 152 above. For example, third optimization model 153 may attempt to further minimize the unassigned train block volume (i.e., the second objective of second optimization model 152 above) by assigning a weight to the second objective (i.e., minimize a volume of unassigned train blocks 122) that is greater than a weight of the first objective (i.e., minimize an amount of total distance a plurality of pull engines must travel to build a plurality of outbound trains).

In some situations, third optimization model 153 yields assignments for train blocks 122 that result in an unassigned volume of train blocks 122 that is greater than zero (i.e., not all train blocks 122 were assigned to classification tracks 123). In this situation, train block stacking optimizer 150 may utilize fourth optimization model 154. Fourth optimization model 154 is described in more detail below.

In some embodiments, train block stacking optimizer 150 utilizes fourth optimization model 154 when optimization models 151-153 have all yielded an unassigned volume of train blocks 122 that is greater than zero in some time period of the planning horizon. In general, fourth optimization model 154 relaxes the stacking logic by allowing for "bad stacks" as opposed to "good stacks" in second optimization model 152 and third optimization model 153. As used herein, "bad stacks" or "bad stacking logic" may refer to suboptimal stacking decisions (e.g., do not account for or care about the sequence of pull times for multiple train blocks 122 on the same classification track 123). In some embodiments, fourth optimization model 154 is formulated to meet the following objectives: minimize an amount of total distance a plurality of pull engines must travel to build a plurality of outbound trains; and minimize the volume of unassigned train blocks 122. In some embodiments, fourth optimization model 154 utilizes the set notations as shown in TABLE 7 below:

TABLE 7

Set Notations for Fourth Optimization Model 154

I = Set of all blocks
i = Element of set I
J = Set of all tracks
j = Element of set J
j' = Element of set J
K = Sequence of all trains departing a station ordered by their departure time
k = An element of sequence K
$k_a$ = Element at index 'a' of sequence K
N = Set of all groups
n = element of set N
$\kappa_k$ = Set of blocks that belong to train 'k'
$i_k$ = An element of set $\kappa_k$
$v_n$ = Set of tracks that belong to group 'n'
$j_n$ = An element of set $v_n$
$t_{i_k}^s$ = Hump start period for block 'i' belonging to train 'k'
$t_{i_k}^e$ = Hump end period for block 'i' belonging to train 'k'
$t_{i_k}$ = Set of all periods for block 'i' belonging to train 'k' (i.e., $t_{i_k}^s, t_{i_k}^{s+1}, \ldots, t_{i_k}^{e-1}, t_{i_k}^e$)
$p_{i_k}$ = Pull period for block 'i' belonging to train 'k'
$\varphi_{i_k, t}$ = Set of blocks that can be assigned with block '$i_k$'
in period 't' on same tracks as '$i_k$'
$i"_{k"}$ = An element of set $\varphi_{i_k, t}$
Bad Stacking Logic
$i"_{k"} \in \varphi_{i_k, t}$, if either of the following condition is satisfied:
1.     The hump end time for $i"_{k"}$ ($t_{i"_{k"}}^e$), hump start time of $i_k$ ($t_{i_k}^s$) is
    $t_{i"_{k"}}^e \leq t_{i_k}^s$. And pull time for $i"_{k"}$ ($p_{i"_{k"}}$), is $p_{i"_{k"}} \geq t_{i_k}^s$.
2.     The hump start time for $i"_{k"}$ ($t_{i"_{k"}}^s$), hump end time of $i_k$ ($t_{i_k}^e$) is
    $t_{i"_{k"}}^s \geq t_{i_k}^e$. And pull time for $i"_{k"}$ ($p_{i"_{k"}}$), pull time of $i_k$ ($p_{i_k}$) is
    $p_{i"_{k"}} \geq p_{i_k}$. Furthermore, $p_{i_k} \geq t_{i"_{k"}}^s$.
$\varphi'_{i_k, t} = I - \varphi_{i_k, t}$
$\varphi'_{i_k, t}$ is the set of blocks that cannot be assigned to same tracks as '$i_k$' assigned in period 't'.

In some embodiments, fourth optimization model 154 utilizes the input parameters as shown in TABLE 8 below:

TABLE 8

Input Parameters for Fourth Optimization Model 154

$B_{i_k, t}$ = Expected cumulative feet for block 'i' assigned to train 'k' humped by period 't'
$C_j$ = Maximum of track 'j'
$\delta_{j, t}$ = Unavailable track length of track 'j' in period 't'
$D_{j, j'}$ = Distance of track 'j' from track 'j''
M = Big – M
K = Fixed trains in same lead for consolidation opportunities
$\Lambda$ = Fixed lead assignment
$\theta_f$ = Fixed track assignment In some embodiments, fourth optimization model 154 utilizes the decision variables as shown in TABLE 9 below:

TABLE 9

Decision Variables for Fourth Optimization Model 154

$v_{i_k, j, t}$ = volume of block 'i' belonging to train 'k' assigned to track 'j' in period 't'
$u_{i_k, t}$ = Unassigned volume of block 'i' belonging to train 'k' in period 't'
$x_{i_k, j, t}$ = 1, if block 'i' belonging to train 'k' is assigned to track 'j' in period 't', otherwise 0
$r_{k, j, t}$ = 1, if train 'k' has any of its block on track 'j' in period 't', otherwise 0
$y_{j,j', k, t}$ = 1, if train 'k' has blocks on track 'j' and 'j''' in period 't', otherwise 0
$g_{k, n, t}$ = 1, if train 'k' as any of its block in group 'n' in period 't', otherwise 0
$w_{n, n', k, t}$ = 1, if train 'k' has blocks in group 'n' and 'n''' in period 't', otherwise 0

In some embodiments, fourth optimization model 154 is formulated to meet the following two objectives. First, in some embodiments, fourth optimization model 154 minimizes an amount of total distance a plurality of pull engines must travel to build a plurality of outbound trains using the following formula:

$$\sum_{\forall t} \sum_{\forall k} \sum_{\forall j} \sum_{\forall j'} D_{j,j'} * y_{j,j',k,t}$$

Second, in some embodiments, fourth optimization model 154 minimizes a volume of unassigned train blocks 122 using the following formula:

$$\sum_{\forall t} \sum_{\forall i_k} u_{i_k,t}$$

In some embodiments, fourth optimization model 154 is subject to the items in the following list:

1. The length of the allocated classification tracks 123 to all train blocks 122 should be greater than the length of train blocks 122:

$$\sum_{\forall j} v_{i_k,j,t} + u_{i_k,t} = B_{i_k,t} \ldots \forall\, i_k, t$$

2. The sum of the length of all train blocks 122 allocated to track 'j' in period 't', cannot be greater than the available track length for track 'j' in period 't':

$$\sum_{\forall i_k} v_{i_k,j,t} \le C_j - \delta_{j,t} \ldots \forall\, j, t$$

3. If a block '$i_k$' is allocated some volume to a track 'j' in period 't', then $x_{i_k,j,t}=1$:

$$v_{i_k,j,t} - (M+\varepsilon) * x_{i_k,j,t} \le 1 - \varepsilon \ldots \forall\, i_k, j, t$$

4. Stacking constraints:
   a. Assigned volume of the blocks '$i_k$' that cannot be stacked together with block 'ix' in period 't' is zero on any bowl track where block '$i_k$' is assigned:

$$\sum_{\forall i'_{k'} \in \varphi'_{i_k,t}} v_{i'_{k'},j,t} \le M * (1 - x_{i_k,j,t}) \ldots \forall\, i_k, j, t$$

b. Up to two train blocks 122 can be assigned to a single classification track 123 in period 't':

$$\sum_{\forall i_k} x_{i_k,j,t} \le 2 \ldots \forall\, j, t$$

5. Tracking the classification tracks 123 on which the train blocks 122 for a train 'k' are on:

$$r_{k,j,t} >= x_{i_k,j,t} \ldots \forall\, i_k \in \kappa_k, \forall\, j, k, t$$

6. Tracking the movement of pull engines travelled from track to track to build a train 'k':

$$y_{j,j',k,t} \ge r_{k,j,t} + r_{k,j',t} - 1 \ldots \forall\, j, j' \in J, \forall\, j' < j \,\&\, \forall\, k, t$$

$$y_{j,j',k,t} \le r_{k,j,t} \ldots \forall\, j, j' \in J, \forall\, j' < j \,\&\, \forall\, k, t$$

$$y_{j,j',k,t} \le r_{k,j',t} \ldots \forall\, j, j' \in J, \forall\, j' < j \,\&\, \forall\, k, t$$

7. Tracking the groups in which the train 'k' blocks are in:

$$g_{k,n,t} >= r_{k,j_n,t} \ldots \forall\, j_n \in v_n, \forall\, n \in N, \,\&\, \forall\, k$$

8. Keeping track of trains whose train blocks 122 are assigned to multiple pull leads 124:

$$w_{n,n',k,t} \ge g_{k,n,t} + g_{k,n',t} - 1 \ldots \forall\, n, n' \in N, n \ne n', \forall\, k, \forall\, t$$

$$w_{n,n',k,t} \le g_{k,n,t} \ldots \forall\, n, n' \in N, n \ne n', \forall\, k, \forall\, t$$

$$w_{n,n',k,t} \le g_{k,n',t} \ldots \forall\, n, n' \in N, n \ne n', \forall\, k, \forall\, t$$

9. Fixed pull lead 124 assignments:

$$g_{k_\alpha,n_\alpha,t} = 1 \ldots \forall\, k_\alpha, n_\alpha \in A, \forall\, t$$

10. Fixed classification track 123 assignments:

$$x_{i_k,j,t} = 1 \ldots \forall\, i_k, j \in \theta_f$$

Optimization model inputs 160 are various inputs that train block stacking optimizer 150 utilizes to generate optimization model outputs 170. In some embodiments, optimization model inputs 160 include tracks and leads infrastructure 160A, fixed tracks 160B, outbound train schedules 160C, hump order 160D, yard block to train block assignments 160E, unmatched data 160F, and fixed assignments 160G. In some embodiments, optimization model inputs 160 are stored in one or more computer systems and are retrieved and stored in memory 115 of computing system 110. In some embodiments, optimization model inputs 160 are provided by client system 130. For example, one or more optimization model inputs 160 may be retrieved from a remote computer system and displayed on user interface 132 of client system 130. In this way, a user may view and edit optimization model inputs 160 prior to utilization by train block stacking optimizer 150. Specific optimization model inputs 160 that may be utilized by certain embodiments of train block stacking optimization system 100 are discussed in more detail below and with respect to FIGS. 2-8.

Figure 2:
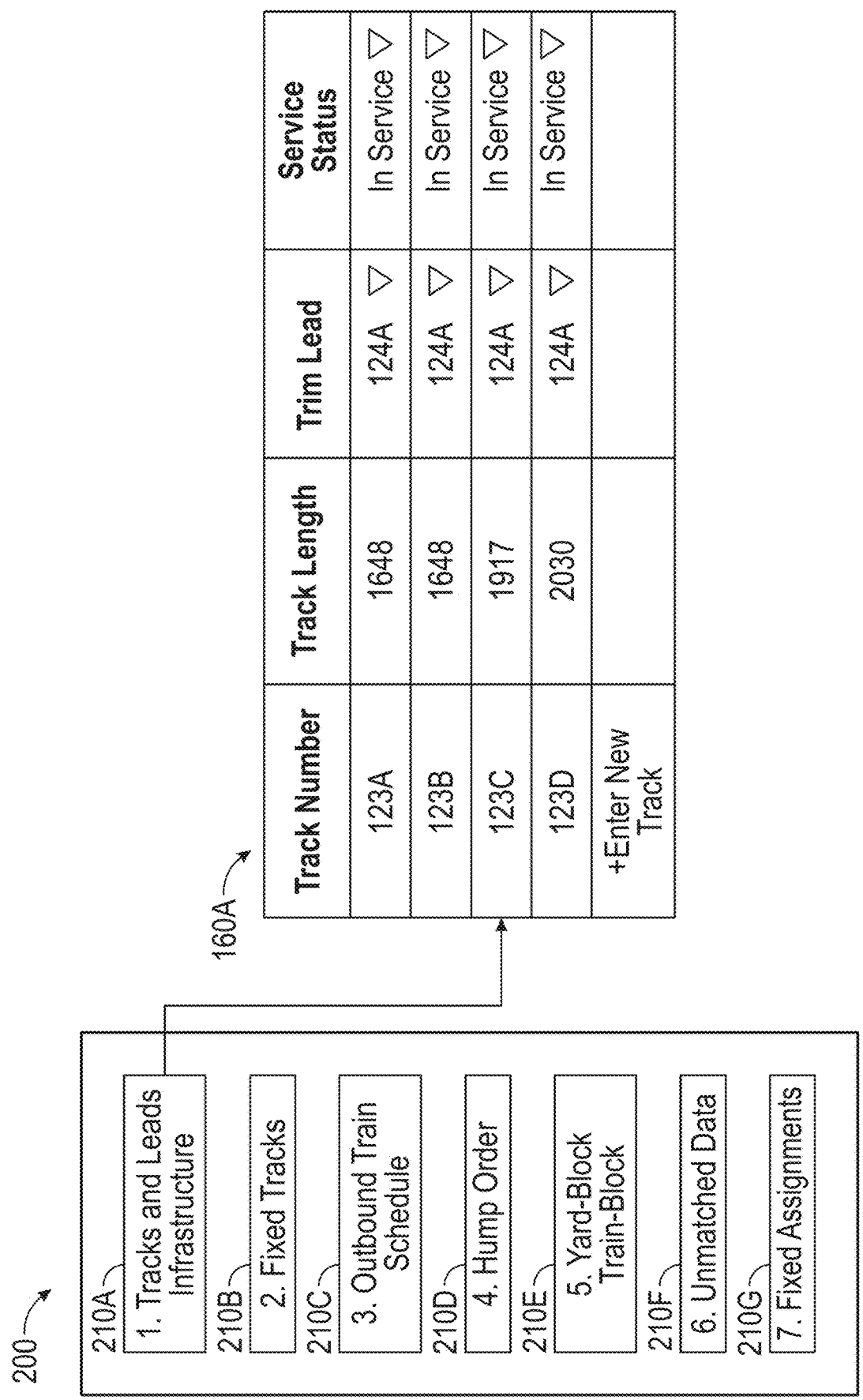
FIGS. 2-8 illustrate user interfaces displaying various optimization model inputs that may be used by the systems and methods presented herein, according to particular embodiments.

FIGS. 2-8 illustrate user interfaces 200 displaying various optimization model inputs 160 that may be used by the systems and methods presented herein, according to particular embodiments. As illustrated in FIG. 2, a user may select a user-selectable element 210A to display and edit tracks and leads infrastructure 160A. In general, tracks and leads infrastructure 160A may include one or more of: a track number (e.g., classification track 123A), a track length (e.g., 1648 feet) of the corresponding classification track 123, a trim lead (e.g., pull lead 124A) of the corresponding classification track 123, and a service status (e.g., "in service" or "out of service") of the corresponding classification track 123, as illustrated. One or more of the data elements of tracks and leads infrastructure 160A may be edited by the user (e.g., using client system 130). In addition, a user may be provided with an interface as illustrated to enter new entries within tracks and leads infrastructure 160A.

Figure 3:
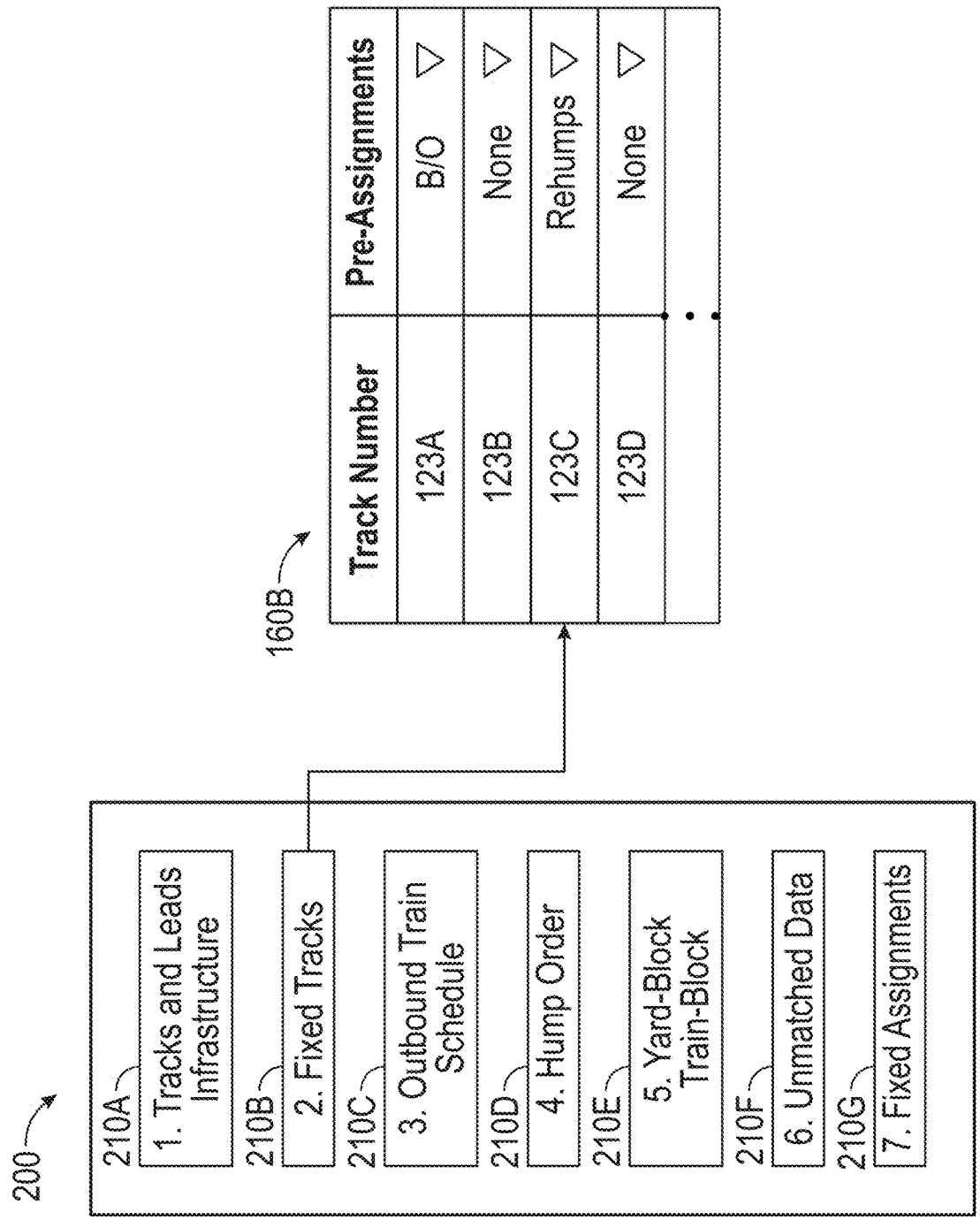

As illustrated in FIG. 3, a user may select a user-selectable element 210B to display and edit fixed tracks 160B. In general, fixed tracks 160B may include one or more of: a track number (e.g., classification track 123A), and a pre-assignment for the corresponding classification track 123 (e.g., "B/O" for bad orders, "None," "Rehumps," etc.), as illustrated. One or more of the data elements of fixed tracks 160B may be edited by the user (e.g., using client system 130). In addition, a user may be provided with an interface as illustrated to enter new entries within fixed tracks 160B.

Figure 4:
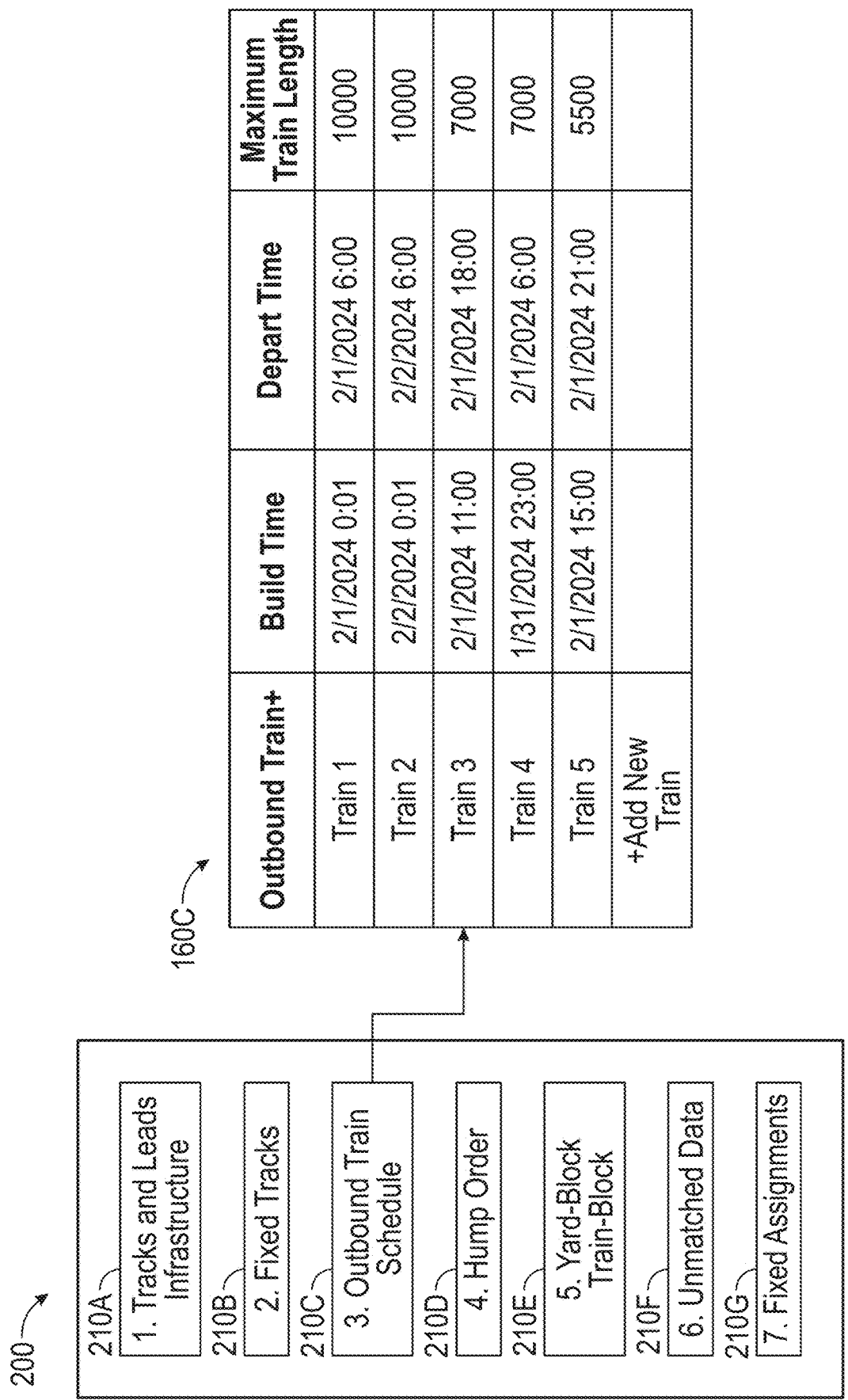

As illustrated in FIG. 4, a user may select a user-selectable element 210C to display outbound train schedules 160C. In general, outbound train schedules 160C may be real-time or actual train schedules and may include one or more of: an outbound train identifier (e.g., "TRAIN 1"), a build time for the corresponding outbound train, a depart time for the corresponding outbound train, and a maximum train length for the corresponding outbound train, as illustrated. One or more of the data elements of outbound train schedules 160C may be edited by the user (e.g., using client system 130). In addition, a user may be provided with an interface as illustrated to enter new entries within outbound train schedules 160C.

Figure 5:
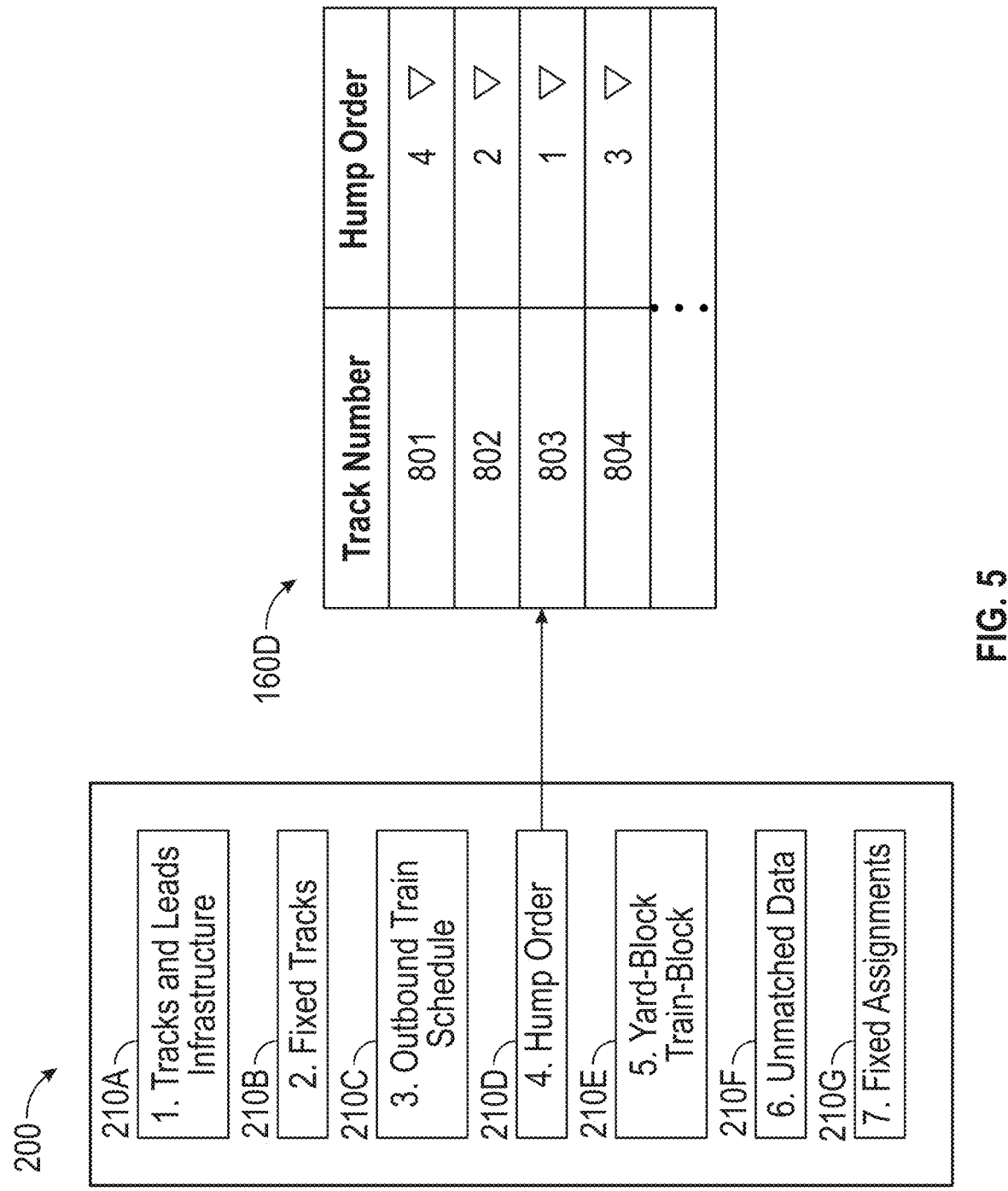

As illustrated in FIG. 5, a user may select a user-selectable element 210D to display hump order 160D. In general, hump order 160D may include one or more of: a track number (e.g., classification track 123A) and a hump order (i.e., the order in which arrival tracks would be humped) for the corresponding classification track 123, as illustrated. One or more of the data elements of hump order 160D may be edited by the user (e.g., using client system 130). In addition, a user may be provided with an interface as illustrated to enter new entries within hump order 160D.

Figure 6:
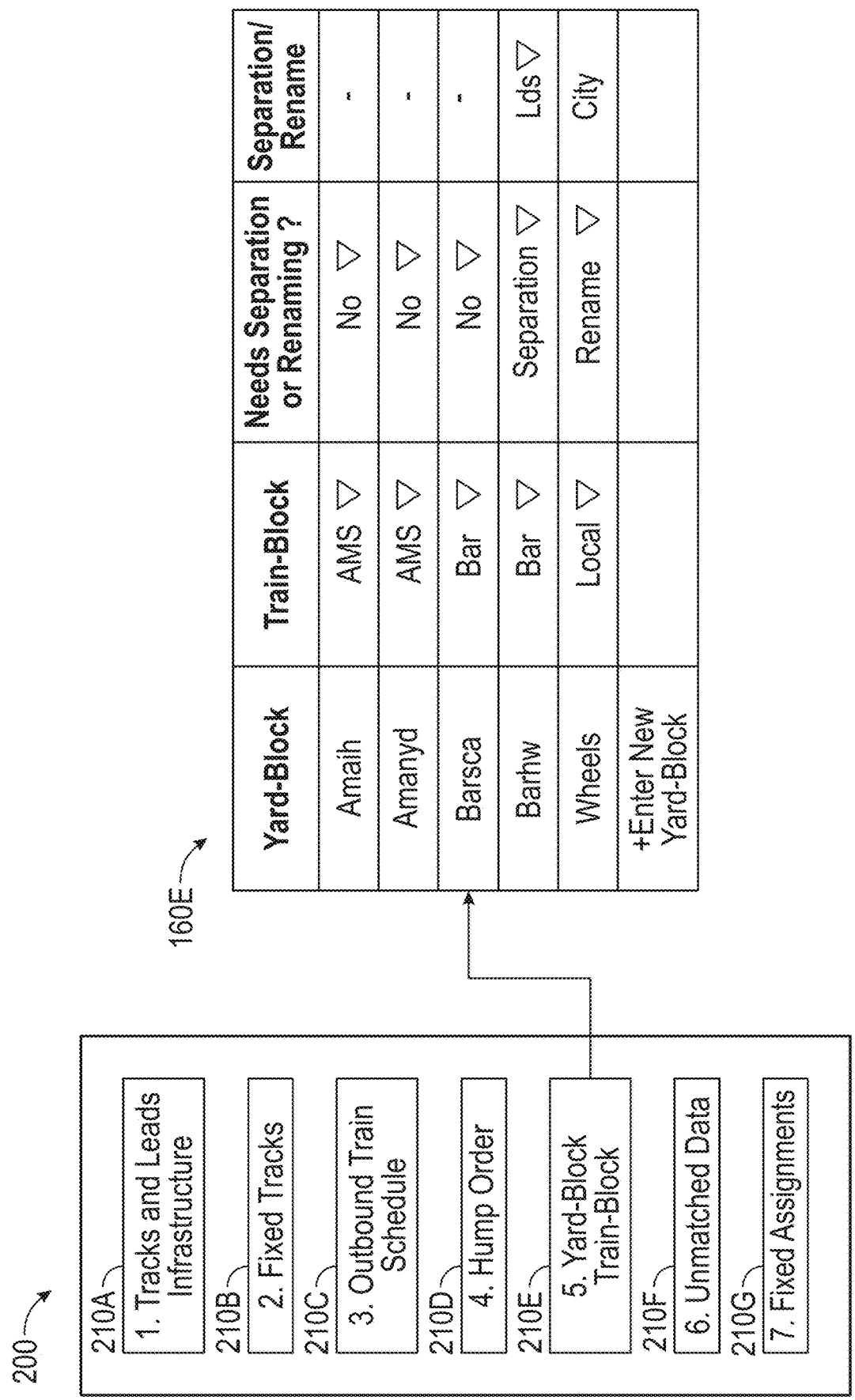

As illustrated in FIG. 6, a user may select a user-selectable element 210E to display and edit yard block to train block assignments 160E. In general, yard block to train block assignments 160E may include: a yard block name/symbol; a corresponding train block name/symbol; a corresponding separation/renaming option; and a corresponding separation/renaming selection, as illustrated. In some embodiments, data within yard block to train block assignments 160E may be pre-populated using the systems and methods described in U.S. patent application Ser. No. 18/672,747 which is incorporated by reference herein in its entirety. One or more of the data elements of yard block to train block assignments 160E may be edited by the user (e.g., using client system 130). In addition, a user may be provided with an interface as illustrated to enter new entries within yard block to train block assignments 160E.

Figure 7:
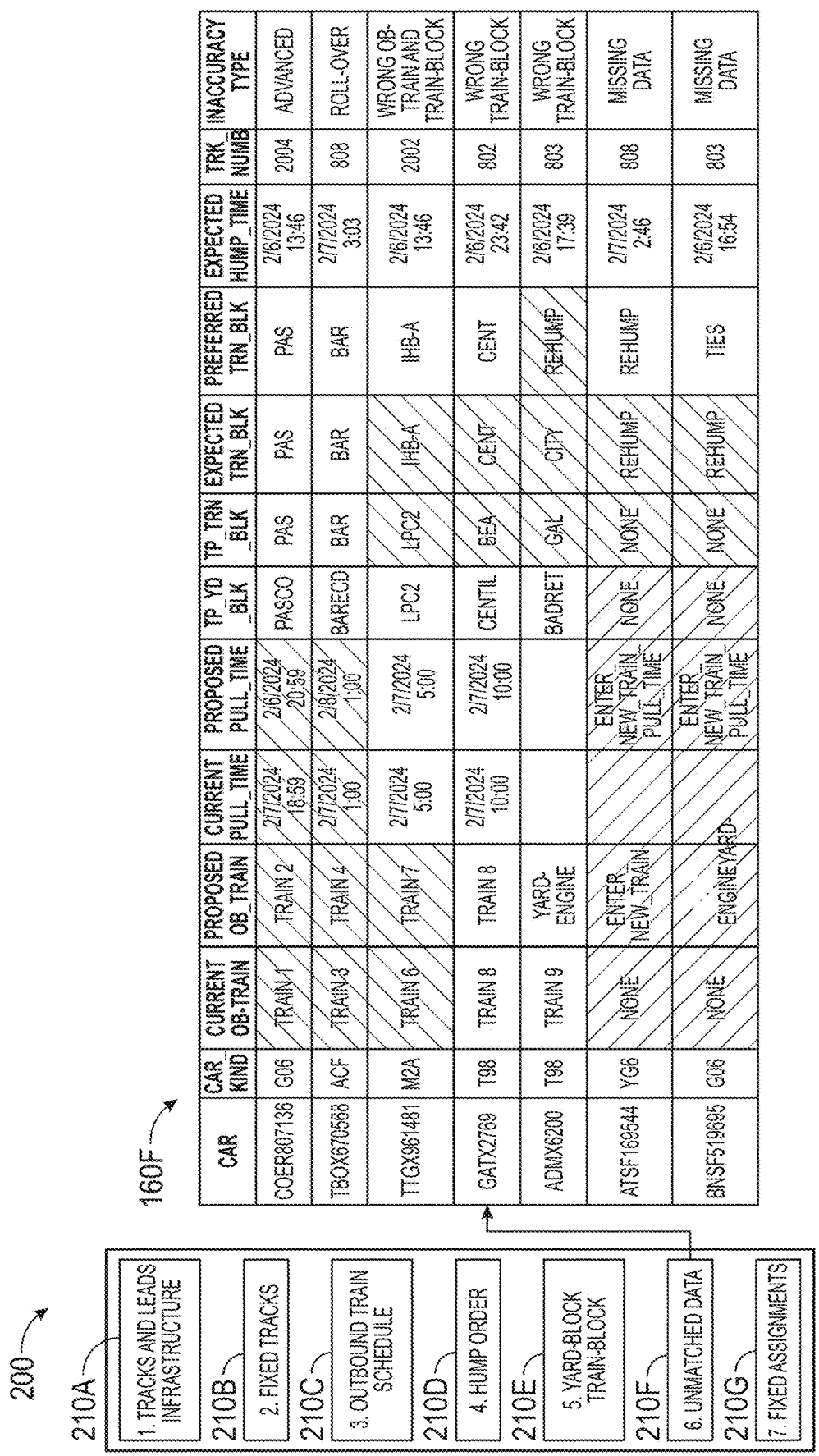

As illustrated in FIG. 7, a user may select a user-selectable element 210F to display unmatched data 160F. In general, unmatched data 160F is data from optimization model inputs 160 that has been processed by train block stacking optimizer 150 in order to determine if any of the data is questionable or missing. A data pre-processor to train block stacking optimizer 150 performs the data check in order to determine and display unmatched data 160F. The data-preprocessor utilizes the user inputs from user-selectable elements 210A-210E to verify the accuracy of input data for railcars gathered from a database. The inaccurate/unmatched data is displayed to the user to provide the accurate information. Once the user updates the information with accurate data, final data processing is performed. The final processed data is then fed to train block stacking optimizer 150 to generate the output results.

In some embodiments, unmatched data 160F includes a car identifier, a car kind, a current outbound train, a proposed outbound train, a current pull time, a proposed pull time, a yard block identifier, a train block identifier, an expected train block identifier, a preferred train block identifier, an expected hump time, a track number, and an inaccuracy type, as illustrated. In some embodiments, train block stacking optimizer 150 may identify data within unmatched data 160F that a user should review. For example, train block stacking optimizer 150 may highlight certain data within unmatched data 160F that requires user review. As a specific example, train block stacking optimizer 150 may highlight a current pull time and a proposed pull time when train block stacking optimizer 150 determines that the current pull time is incorrect or suboptimal, as illustrated in the first row of unmatched data 160F in FIG. 7. As another example, train block stacking optimizer 150 may highlight missing data within unmatched data 160F as illustrated in the last two rows of unmatched data 160F in FIG. 7. In some embodiments, a user may view and edit unmatched data 160F using client system 130.

Figure 8:
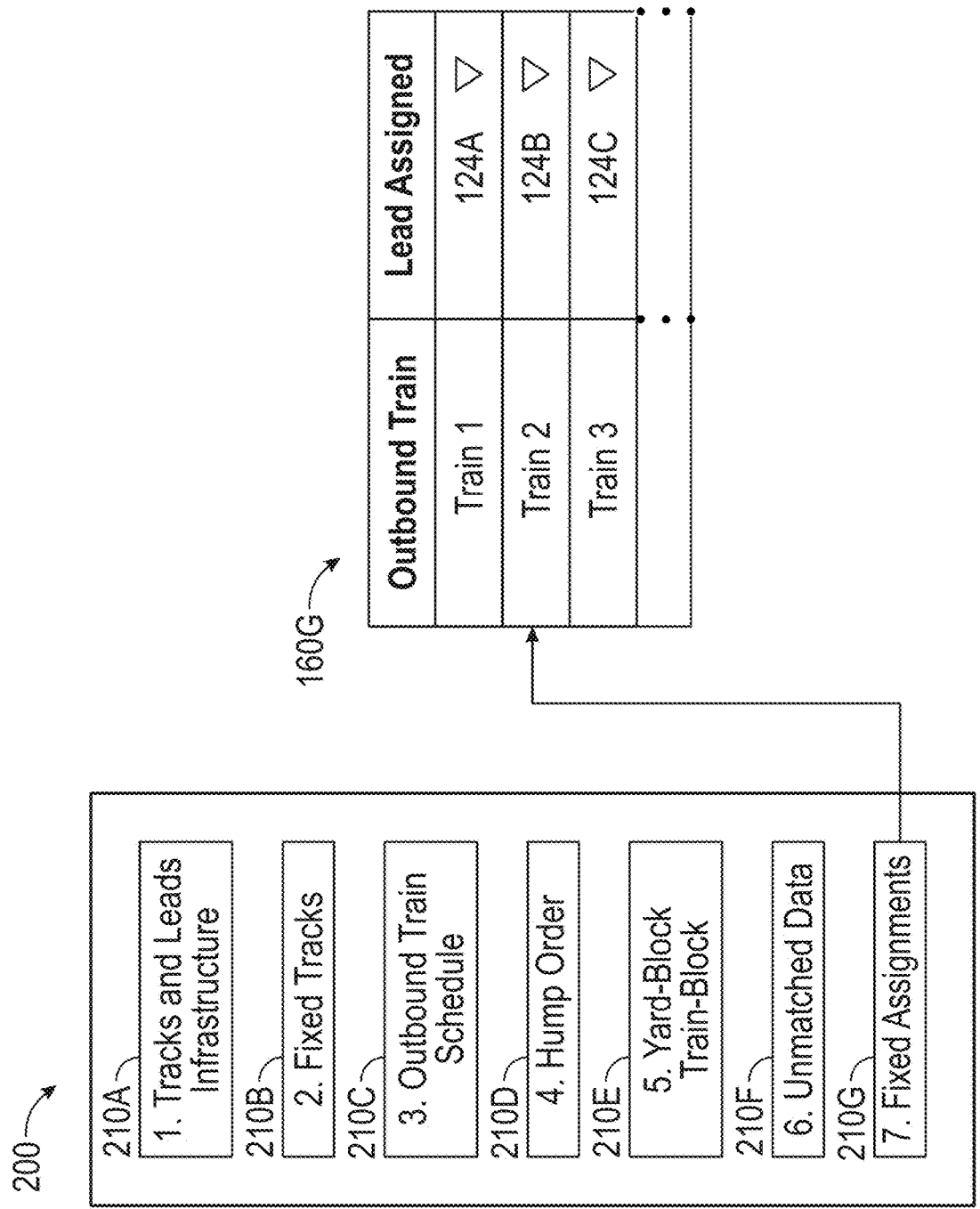

As illustrated in FIG. 8, a user may select a user-selectable element 210G to display and edit fixed assignments 160G. In general, fixed assignments 160G may include: an outbound train identifier (e.g., "TRAIN 1") and a lead assigned to the corresponding outbound train (e.g., pull lead 124A), as illustrated. In some embodiments, data within yard block to train block assignments 160E may be pre-populated using the systems and methods described in U.S. patent application Ser. No. 18/672,747. One or more of the data elements of fixed assignments 160G may be edited by the user (e.g., using client system 130). In addition, a user may be provided with an interface as illustrated to enter new entries within fixed assignments 160G.

As discussed above, train block stacking optimizer 150 may utilize up to four optimization models to optimally assign train blocks 122 at a railroad merchandise yard 120: first optimization model 151, second optimization model 152, third optimization model 153, and fourth optimization model 154. Each optimization model 151-154 generates one or more optimization model outputs 170 that may be presented to a user on client system 130 (e.g., using a notification) and/or be used to generate switching signals 180. Optimization model outputs 170 from optimization models 151-154 are described in more detail below with reference to FIGS. 9-10.

Figure 9:
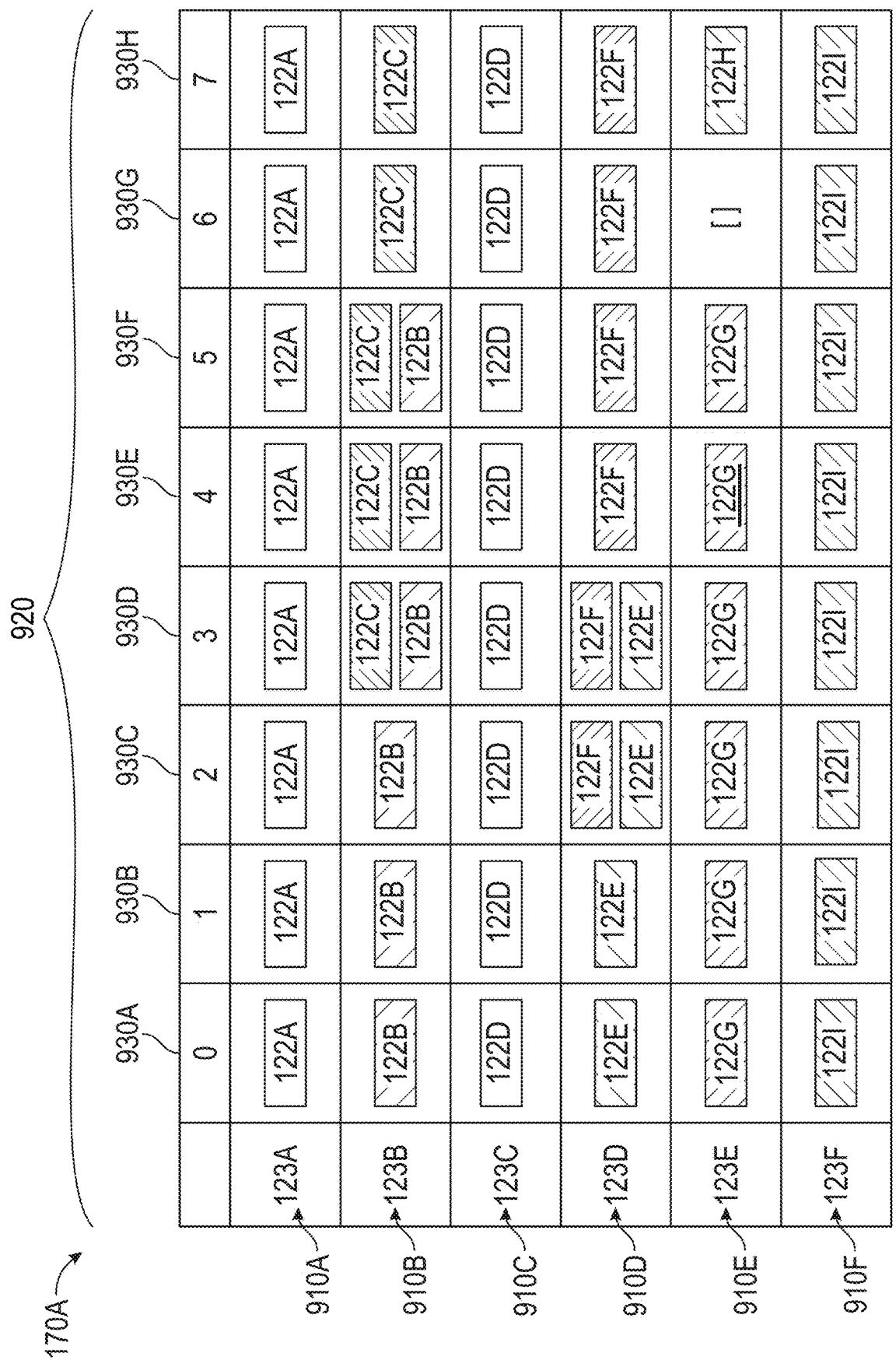
FIG. 9 illustrates an output planning horizon chart that may be generated by the systems and methods presented herein, according to particular embodiments.

FIG. 9 illustrates an output planning horizon chart 170A showing block-to-track assignments generated by train block stacking optimizer 150, according to particular embodiments. In general, planning horizon chart 170A is a list of assignments of train blocks 122 to classification tracks 123 over a planning horizon 920. Planning horizon 920 may be divided into time periods 930 (e.g., 930A-930H). As specific examples, planning horizon 920 may be the next eight hours and each time period 930 may be one-hour time periods. In some embodiments, each row 910 (e.g., 910A-910F) of planning horizon chart 170A corresponds to a single classification track 123 and indicates which train blocks 122 are assigned to the classification track 123 for each time period 930 of planning horizon 920. As a specific example, row 910A of planning horizon chart 170A corresponds to classification track 123A and indicates that train block 122A is assigned to classification track 123A for every time period 930A-930H of planning horizon 920. As another example, row 910B of planning horizon chart 170A corresponds to classification track 123B and indicates that train block 122B is assigned to classification track 123B for time periods 930A-930F and that train block 122C is assigned to classification track 123B for time periods 930D-930H. Row 910B illustrates how a user can quickly discern that train blocks 122C and 122B are stacked on classification track 123B during time periods 930D-930F.

Figure 10:
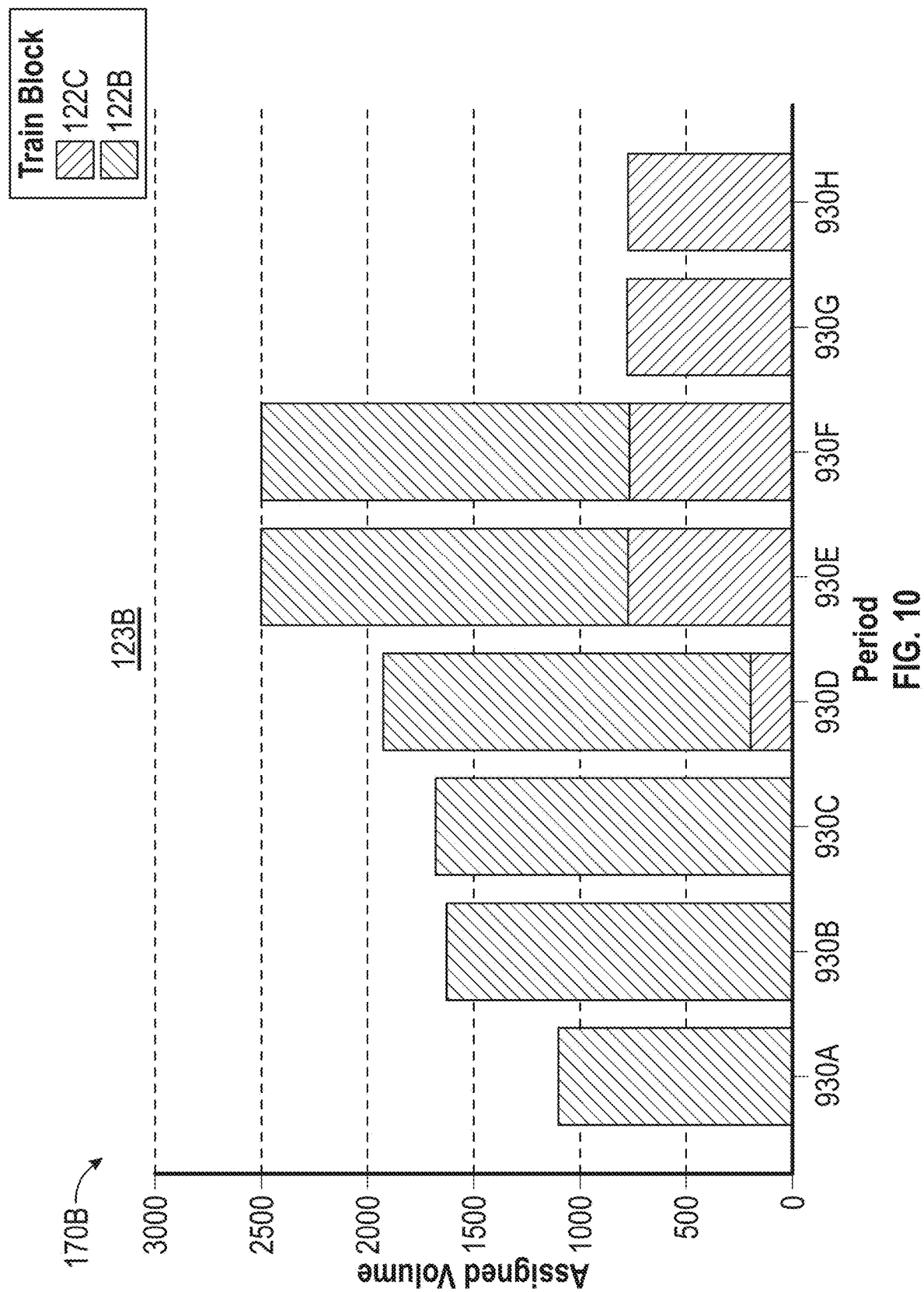
FIG. 10 illustrates an output train block volume chart that may be generated by the systems and methods presented herein, according to particular embodiments.

FIG. 10 illustrates a train block volume chart 170B that may be generated by train block stacking optimizer 150, according to particular embodiments. In general, train block volume chart 170B provides a visual indication of train block 122 assignments for a particular classification track 123 for each time period 930 of planning horizon 920. Train block volume chart 170B helps yardmasters and other users to visually understand train block 122 assignments (including assigned volume and stacking operations) for each classification track 123 for the upcoming planning horizon 920. In some embodiments, train block volume chart 170B includes an x-axis for time periods 930 and a y-axis for assigned volume of train blocks 122 (in feet). In the illustrated example of FIG. 10, train block volume chart 170B corresponds to row 910B of FIG. 9 and provides a visual indication of the volume and assignments of train blocks 122B and 122C for classification track 123B. By viewing train block volume chart 170B, a yardmaster or other user may quickly understand the volume of train block 122B that is assigned to classification track 123B for time periods 930A-930F and the volume of train block 122C that is assigned to classification track 123B for time periods 930D-930H.

Switching signals 180 are any electronic signals that are sent (e.g., wirelessly or wired) to hump yard switching equipment 125 in order to automatically control switching operations of railcars 121 and to direct railcars 121 to their assigned classification tracks 123 according to the outputs 170 of train block stacking optimizer 150. For example, if a list of train block assignments (e.g., planning horizon chart 170A) for train blocks 122 and classification tracks 123 is generated by train block stacking optimizer 150 (i.e., using optimization models 151-154 as described herein), the assignments may be communicated to hump yard switching equipment 125 using switching signals 180. As a specific example, when train block 122A is separated from an inbound train, it may be automatically directed to its assigned track (e.g., classification track 123A as shown in row 910A of planning horizon chart 170A) using switching signals 180. To do so, computing system 110 may send switching signals 180 to hump yard switching equipment 125 that operate one or more track switches in order to direct train block 122A to classification track 123A in classification yard 120.

In operation, and in reference to FIGS. 1-10, train block stacking optimization system 100 utilizes train block stacking optimizer 150 to provide optimization model outputs 170 (i.e., planning horizon chart 170A and train block volume chart 170B) for assigning train blocks 122 to classification tracks 123 (e.g., 123A-123F) of classification yard 120. To do so, some embodiments of train block stacking optimizer 150 first access one or more optimization model inputs 160. For example, train block stacking optimizer 150 may access one or more of tracks and leads infrastructure 160A, fixed tracks 160B, outbound train schedules 160C, hump order 160D, yard block to train block assignments 160E, unmatched data 160F, and fixed assignments 160G. Optimization model inputs 160 may be stored in memory 115 of computing system 110. In some embodiments, one or more of optimization model inputs 160 may be received from a remote computer system (e.g., via network 140).

In some embodiments, train block stacking optimization system 100 may display one or more of optimization model inputs 160 on client system 130 in order to allow a user to verify, edit, or add information to optimization model inputs 160. For example, computing system 110 may send optimization model inputs 160 for display on client system 130 via network 140 (e.g., using a notification). If a user edits or adds information to optimization model inputs 160, the modified optimization model inputs 160 may then be sent back to computing system 110 from client system 130 for storage in memory 115.

Next, train block stacking optimization system 100 utilizes optimization model inputs 160 and up to four different optimization models (i.e., first optimization model 151, second optimization model 152, third optimization model 153, and fourth optimization model 154) in order generate train block assignments for planning horizon 920. In some embodiments, train block stacking optimizer 150 may first utilize first optimization model 151 to determine a first list of train block assignments for planning horizon 920 (e.g., planning horizon chart 170A) for train blocks 122 and classification tracks 123 of classification yard 120 (e.g., a classification bowl), as described using the detailed equations and formulas above. The first optimization model 151 is configured to assign a maximum of one train block 122 per classification track 123 (i.e., no stacking). If the amount of unassigned train block volume from first optimization model 151 is equal to zero (e.g., if all train blocks 122 are assigned to classification tracks 123 using first optimization model 151), the optimization model outputs 170 of first optimization model 151 may be utilized. For example, the optimization model outputs 170 from first optimization model 151 may be sent for display on client system 130. In addition, the optimization model outputs 170 from first optimization model 151 may be used to generate switching signals 180 which are then sent to hump yard switching equipment 125.

If, however, the amount of unassigned train block volume from first optimization model 151 is greater than zero (e.g., if not all train blocks 122 are able to be assigned to classification tracks 123 using first optimization model 151), train block stacking optimizer 150 may generate optimization model outputs 170 using second optimization model 152, as described using the detailed equations and formulas above. Second optimization model 152 may be configured to assign a maximum of two train blocks 122 per classification track 123 (i.e., stacking is permitted), as discussed above. If the amount of unassigned train block volume from second optimization model 152 is equal to zero (e.g., if all train blocks 122 are assigned to classification tracks 123 using second optimization model 152), the optimization model outputs 170 of second optimization model 152 may be utilized. For example, the optimization model outputs 170 from second optimization model 152 may be sent for display on client system 130. In addition, the optimization model outputs 170 from second optimization model 152 may be used to generate switching signals 180 which are then sent to hump yard switching equipment 125.

If, however, the amount of unassigned train block volume from second optimization model 152 is greater than zero (e.g., if not all train blocks 122 are able to be assigned to classification tracks 123 using second optimization model 152), train block stacking optimizer 150 may generate optimization model outputs 170 using third optimization model 153, as described using the detailed equations and formulas above. Third optimization model 153 may be configured to assign a maximum of two train blocks 122 per classification track 123 (i.e., stacking is permitted) as well as minimize the unassigned train block volume by adjusting weights of a plurality of objectives, as discussed above. If the amount of unassigned train block volume from third optimization model 153 is equal to zero (e.g., if all train blocks 122 are assigned to classification tracks 123 using third optimization model 153), the optimization model outputs 170 of third optimization model 153 may be utilized. For example, the optimization model outputs 170 from third optimization model 153 may be sent for display on client system 130. In addition, the optimization model outputs 170 from third optimization model 153 may be used to generate switching signals 180 which are then sent to hump yard switching equipment 125.

If, however, the amount of unassigned train block volume from third optimization model 153 is greater than zero (e.g., if not all train blocks 122 are able to be assigned to classification tracks 123 using third optimization model 153), train block stacking optimizer 150 may generate optimization model outputs 170 using fourth optimization model 154, as described using the detailed equations and formulas above. Fourth optimization model 154 may be configured to assign a maximum of two train blocks 122 per classification track 123 (i.e., stacking is permitted) as well as allow for suboptimal stacking decisions over the third optimization model (i.e., "bad stacking"), as discussed above. The optimization model outputs 170 from fourth optimization model 154 may be sent for display on client system 130. In addition, the optimization model outputs 170 from fourth optimization model 154 may be used to generate switching signals 180 which are then sent to hump yard switching equipment 125.

As a result, assignments of train blocks 122 to classification tracks 123 within classification yard 120 for planning horizon 920 may be optimized and be more efficient than typical operations where a Trainmaster manually decides train block 122 assignments within classification yard 120. Specific methods utilizing train block stacking optimizer 150 to generate optimization model outputs 170 are discussed in more detail below with respect to FIGS. 11-13.

Figure 11:
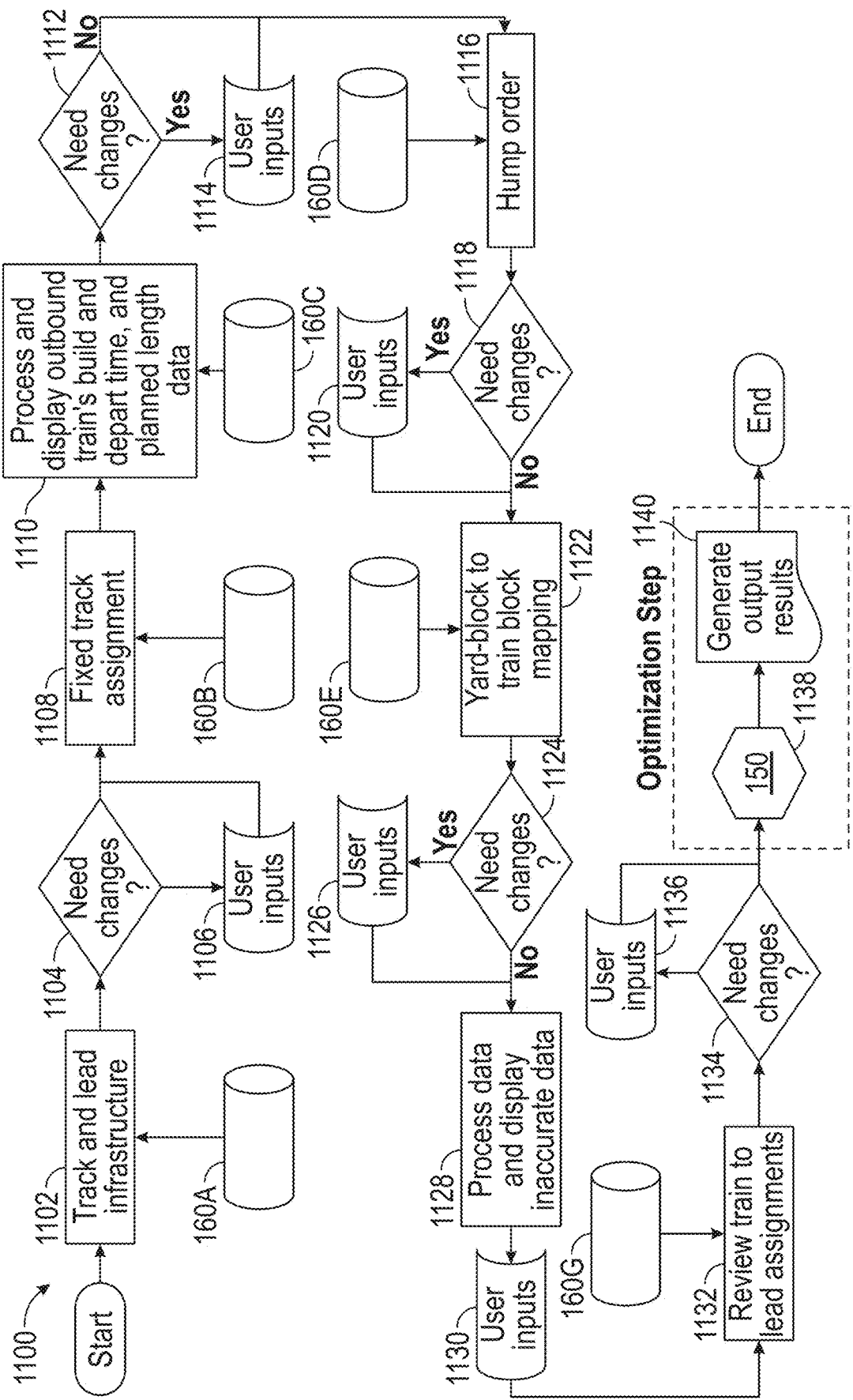
FIG. 11 is a chart illustrating a method for providing optimal rail car stacking at a railroad merchandise yard, according to particular embodiments.

FIG. 11 is a chart illustrating a method 1100 for optimally assigning and stacking train blocks such as train blocks 122 at a railroad merchandise yard 120 over a planning horizon 920, according to particular embodiments. In some embodiments, method 1100 may be performed by train block stacking optimizer 150 of train block stacking optimization system 100. At step 1102, method 1100 processes tracks and leads infrastructure 160A. In some embodiments, tracks and leads infrastructure 160A is stored in memory 115 of computing system 110. In some embodiments, tracks and leads infrastructure 160A is electronically retrieved from a remote computing system. An example of tracks and leads infrastructure 160A is illustrated in FIG. 2.

At step 1104, method 1100 determines if any changes are needed in tracks and leads infrastructure 160A. To do so, tracks and leads infrastructure 160A may be sent to and displayed on client system 130. If a user makes any changes to tracks and leads infrastructure 160A using client system 130, the changes are received by computing system 110 and processed by method 1100 at step 1106. If no changes are made to tracks and leads infrastructure 160A, method 1100 proceeds to step 1108.

At step 1108, method 1100 processes fixed track assignments 160B. In some embodiments, fixed track assignments 160B are stored in memory 115 of computing system 110. In some embodiments, fixed track assignments 160B are electronically retrieved from a remote computing system. An example of fixed track assignments 160B is illustrated in FIG. 3.

At step 1110, method 1100 processes outbound train schedules 160C. In some embodiments, outbound train schedules 160C is stored in memory 115 of computing system 110. In some embodiments, outbound train schedules 160C is electronically retrieved from a remote computing system. An example of outbound train schedules 160C is illustrated in FIG. 4.

At step 1112, method 1100 determines if any changes are needed in outbound train schedules 160C. To do so, outbound train schedules 160C may be sent to and displayed on client system 130. If a user makes any changes to outbound train schedules 160C using client system 130, the changes are received by computing system 110 and processed by method 1100 at step 1114. If no changes are made to outbound train schedules 160C, method 1100 proceeds to step 1116.

At step 1116, method 1100 processes hump order 160D. In some embodiments, hump order 160D is stored in memory 115 of computing system 110. In some embodiments, hump order 160D is electronically retrieved from a remote computing system. An example of hump order 160D is illustrated in FIG. 5.

At step 1118, method 1100 determines if any changes are needed in hump order 160D. To do so, hump order 160D may be sent to and displayed on client system 130. If a user makes any changes to hump order 160D using client system 130, the changes are received by computing system 110 and processed by method 1100 at step 1120. If no changes are made to hump order 160D, method 1100 proceeds to step 1122.

At step 1122, method 1100 processes yard block to train block assignments 160E. In some embodiments, yard block to train block assignments 160E is stored in memory 115 of computing system 110. In some embodiments, yard block to train block assignments 160E is electronically retrieved from a remote computing system. An example of yard block to train block assignments 160E is illustrated in FIG. 6.

At step 1124, method 1100 determines if any changes are needed in yard block to train block assignments 160E. To do so, yard block to train block assignments 160E may be sent to and displayed on client system 130. If a user makes any changes to yard block to train block assignments 160E using client system 130, the changes are received by computing system 110 and processed by method 1100 at step 1126. If no changes are made to yard block to train block assignments 160E, method 1100 proceeds to step 1128.

At step 1128, method 1100 processes optimization model inputs 160 and displays unmatched data 160F on client system 130. An example of unmatched data 160F is illustrated in FIG. 7. At step 1130, the user is given an opportunity to examine and correct data within unmatched data 160F. After step 1130, method 1100 proceeds to step 1132.

At step 1132, method 1100 processes fixed assignments 160G. In some embodiments, fixed assignments 160G is stored in memory 115 of computing system 110. In some embodiments, fixed assignments 160G is electronically retrieved from a remote computing system. An example of fixed assignments 160G is illustrated in FIG. 8.

At step 1134, method 1100 determines if any changes are needed in fixed assignments 160G. To do so, fixed assignments 160G may be sent to and displayed on client system 130. If a user makes any changes to fixed assignments 160G using client system 130, the changes are received by computing system 110 and processed by method 1100 at step 1136. If no changes are made to fixed assignments 160G, method 1100 proceeds to step 1138.

At step 1138, method 1100 utilizes the various optimization model inputs 160 from steps 1102, 1108, 1110, 1116, 1122, 1128, and 1132 to execute train block stacking optimizer 150. Step 1138 may include utilizing first optimization model 151, second optimization model 152, third optimization model 153, or fourth optimization model 154, as described above. A specific example of a method that may be performed in step 1138 is described in more detail with regard to FIG. 12.

At step 1140, some embodiments of method 1100 may display the results of step 1138 using planning horizon chart 170A or train block volume chart 170B. An example of planning horizon chart 170A is illustrated and described in reference to FIG. 9. An example of train block volume chart 170B is illustrated and described in reference to FIG. 10. In some embodiments, step 1140 may include sending a notification to client system 130. After step 1140, method 1100 may end.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for optimally assigning train blocks at a classification yard including the particular steps of the method of FIG. 11, this disclosure contemplates any suitable method for optimally assigning train blocks at a classification yard including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
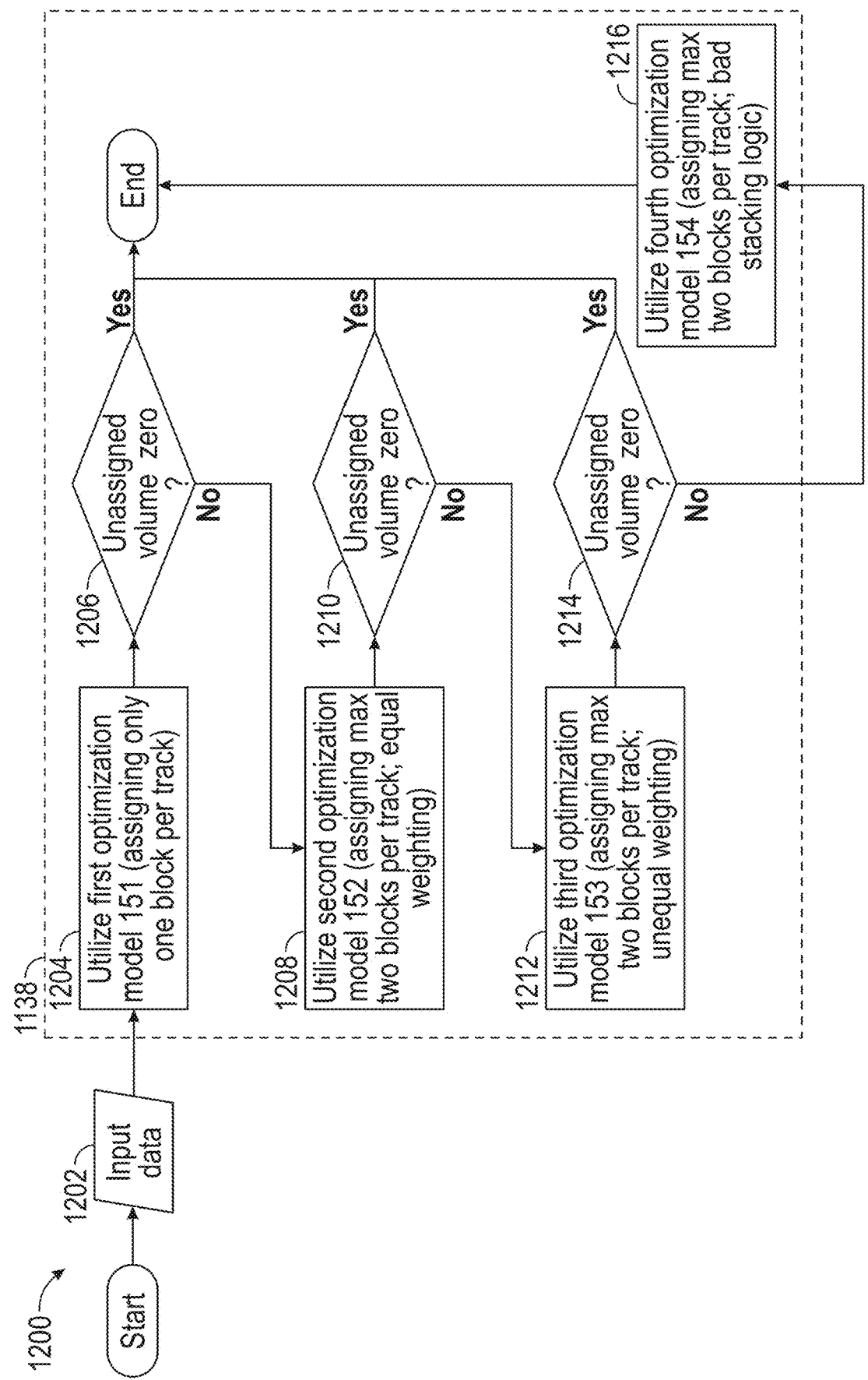
FIG. 12 is a chart illustrating additional details of the method for optimal rail car stacking at a railroad merchandise yard of FIG. 11, according to particular embodiments.

FIG. 12 is a chart illustrating a method 1200 that may be used for step 1138 of method 1100 in FIG. 11, according to particular embodiments. At step 1202, method 1200 accesses input data. In some embodiments, the input data includes one or more optimization model inputs 160 as described herein. At step 1204, method 1200 utilizes first optimization model 151 to assign train blocks 122 to classification tracks 123 for planning horizon 920. In some embodiments, step 1204 includes using the detailed equations and formulas described above with respect to first optimization model 151.

After step 1204, method 1200 proceeds to step 1206 where method 1200 determines whether the solution of step 1204 produces an unassigned volume for train blocks 122 of zero. If the unassigned volume of train blocks 122 is determined to be zero in step 1206, method 1200 may end. If the unassigned volume of train blocks 122 is determined to be greater than zero in step 1206, method 1200 proceeds to step 1208.

At step 1208, method 1200 utilizes second optimization model 152 to assign train blocks 122 to classification tracks 123 for planning horizon 920. In some embodiments, step 1208 includes using the detailed equations and formulas described above with respect to second optimization model 152.

After step 1208, method 1200 proceeds to step 1210 where method 1200 determines whether the solution of step 1208 produces an unassigned volume for train blocks 122 of zero. If the unassigned volume of train blocks 122 is determined to be zero in step 1210, method 1200 may end. If the unassigned volume of train blocks 122 is determined to be greater than zero in step 1210, method 1200 proceeds to step 1212.

At step 1212, method 1200 utilizes third optimization model 153 to assign train blocks 122 to classification tracks 123 for planning horizon 920. In some embodiments, step 1212 includes using the detailed equations and formulas described above with respect to third optimization model 153.

After step 1212, method 1200 proceeds to step 1214 where method 1200 determines whether the solution of step 1212 produces an unassigned volume for train blocks 122 of zero. If the unassigned volume of train blocks 122 is determined to be zero in step 1214, method 1200 may end. If the unassigned volume of train blocks 122 is determined to be greater than zero in step 1214, method 1200 proceeds to step 1216.

At step 1216, method 1200 utilizes fourth optimization model 154 to assign train blocks 122 to classification tracks 123 for planning horizon 920. In some embodiments, step 1216 includes using the detailed equations and formulas described above with respect to fourth optimization model 154. After step 1216, method 1200 may end.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method including the particular steps of the method of FIG. 12, this disclosure contemplates any suitable method including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
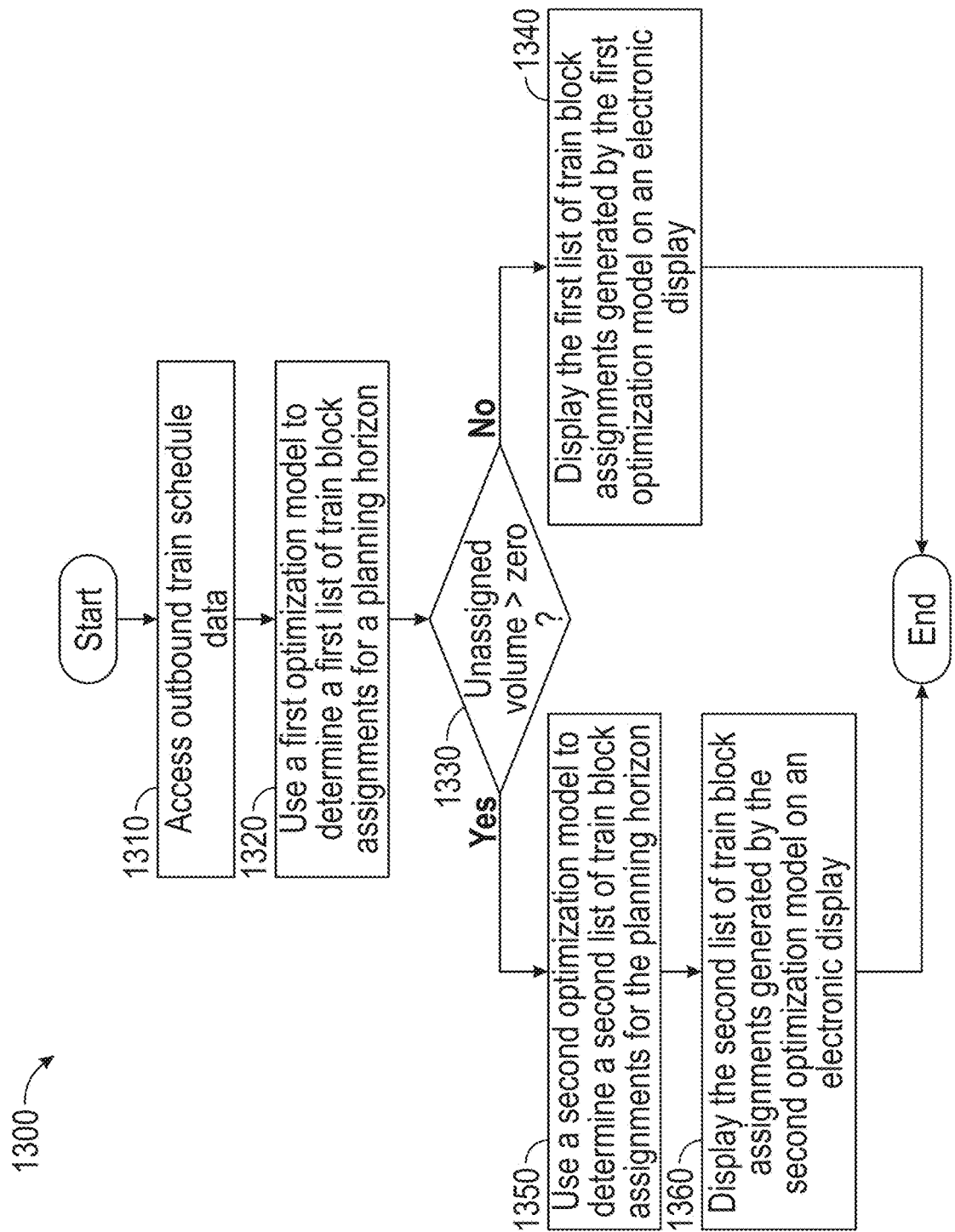
FIG. 13 is a chart illustrating another method for providing optimal rail car stacking at a railroad merchandise yard, according to particular embodiments.

FIG. 13 is a chart illustrating another method 1300 for optimally assigning train blocks at a railroad merchandise yard, according to particular embodiments. In some embodiments, method 1300 may be performed by train block stacking optimizer 150 of train block stacking optimization system 100. At step 1310, method 1300 accesses outbound train schedule data. In some embodiments, the outbound train schedule data is outbound train schedules 160C that is stored in memory 135 of computing system 130. In some embodiments, the outbound train schedule data may be real-time or actual train schedules and may include one or more of: an outbound train identifier, a build time for the corresponding outbound train, a depart time for the corresponding outbound train, and a maximum train length for the corresponding outbound train.

At step 1320, method 1300 determines, using a first optimization model and the outbound train schedule data of step 1310, a first list of train block assignments for a planning horizon. In some embodiments, the first optimization model is first optimization model 151 and the planning horizon is planning horizon 920. In some embodiments, the first list of train block assignments includes a plurality of classification tracks of a classification bowl, a plurality of time periods of the planning horizon, and one or more of a plurality of train blocks that are assigned to each classification track for each time period of the planning horizon. In some embodiments, the plurality of train blocks are train blocks 122, the plurality of classification tracks are classification tracks 123, the classification bowl is classification yard 120, and the time periods are time periods 930. In some embodiments, the first list of train block assignments is planning horizon chart 170A generated by first optimization model 151. In some embodiments, the first optimization model is configured to assign a maximum of one train block of the plurality of train blocks per classification track (i.e., no stacking of the train blocks). In some embodiments, the first optimization model is formulated to meet the following objectives: minimize an amount of total distance a plurality of pull engines must travel to build a plurality of outbound trains; minimize a total number of outbound trains present in multiple pull leads; and minimize the volume of unassigned train blocks.

At step 1330, method 1300 determines whether an unassigned train block volume from the first optimization model in step 1320 is greater than zero. In some embodiments, step 1330 includes determining whether the volume of all train blocks have been assigned to classification tracks within the bowl. In some embodiments, the volume of the plurality of train blocks is a total length of all railcars of the train block in feet. If method 1300 determines in step 1330 that the unassigned train block volume from the first optimization model is not greater than zero, method 1300 proceeds to step 1340. Otherwise, if method 1300 determines in step 1330 that the unassigned train block volume from the first optimization model is greater than zero, method 1300 proceeds to step 1350.

At step 1340, method 1300 displays the first list of train block assignments generated by the first optimization model on an electronic display. In some embodiments, the electronic display is an electronic display of client system 130. After step 1340, method 1300 may end.

At step 1350, method 1300 determines, using a second optimization model and the outbound train schedule data of step 1310, a second list of train block assignments for the planning horizon. In some embodiments, the second optimization model is second optimization model 152 and the planning horizon is planning horizon 920. In some embodiments, the second list of train block assignments includes a plurality of classification tracks of a classification bowl, a plurality of time periods of the planning horizon, and one or more of a plurality of train blocks that are assigned to each classification track for each time period of the planning horizon. In some embodiments, the plurality of train blocks are train blocks 122, the plurality of classification tracks are classification tracks 123, the classification bowl is classification yard 120, and the time periods are time periods 930. In some embodiments, the second list of train block assignments is planning horizon chart 170A generated by second optimization model 152. In some embodiments, the second optimization model is configured to assign a maximum of two train blocks of the plurality of train blocks per classification track (i.e., stacking of two train blocks per classification track is permitted). In some embodiments, the second optimization model is formulated to meet the following objectives: minimize an amount of total distance a plurality of pull engines must travel to build a plurality of outbound trains; and minimize the volume of unassigned train blocks.

At step 1360, method 1300 displays the second list of train block assignments generated by the second optimization model on an electronic display. In some embodiments, the electronic display is an electronic display of client system 130. After step 1360, method 1300 may end.

In some embodiments, method 1300 may additionally determine whether an unassigned train block volume from the second optimization model is greater than zero after determining the second list of train block assignments using the second optimization model in step 1350. In response to determining that the unassigned train block volume from the second optimization model is greater than zero, method 1300 may determine, using a third optimization model and the outbound train schedule data, a third list of train block assignments for the planning horizon. The third optimization model may be third optimization model 153. In some embodiments, the third list of train block assignments is planning horizon chart 170A generated by third optimization model 153. In some embodiments, the third optimization model is configured to assign a maximum of two train blocks of the plurality of train blocks per classification track (i.e., stacking of two train blocks per classification track is permitted) and minimize the unassigned train block volume from the third optimization model.

In some embodiments, method 1300 may additionally determine whether an unassigned train block volume from the third optimization model is greater than zero after determining the third list of train block assignments using the third optimization model. In response to determining that the unassigned train block volume from the third optimization model is greater than zero, method 1300 may determine, using a fourth optimization model and the outbound train schedule data, a fourth list of train block assignments for the planning horizon. The fourth optimization model may be fourth optimization model 154. In some embodiments, the fourth list of train block assignments is planning horizon chart 170A generated by fourth optimization model 154. In some embodiments, the fourth optimization model is configured to assign a maximum of two train blocks of the plurality of train blocks per classification track (i.e., stacking of two train blocks per classification track is permitted) and allow for suboptimal stacking decisions (i.e., "bad stacking") over the third optimization model.

In some embodiments, method 1300 may additionally display, on the electronic display, a bar chart for each classification track of the plurality of classification tracks. In some embodiments, the bar chart is train block volume chart 170B. In some embodiments, the bar chart includes an x-axis that corresponds to the plurality of time periods of the planning horizon and a y-axis that corresponds to assigned volumes of the one or more train blocks.

Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method including the particular steps of the method of FIG. 13, this disclosure contemplates any suitable method including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
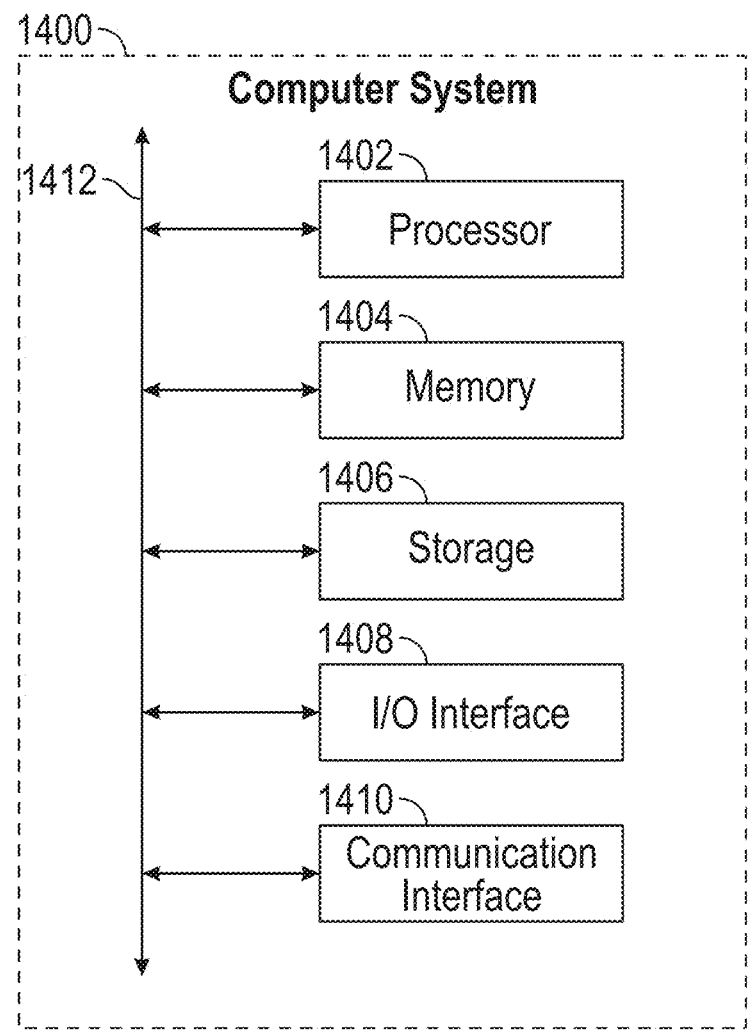
FIG. 14 is an example computer system that can be utilized to implement aspects of the various technologies presented herein, according to particular embodiments.

FIG. 14 illustrates an example computer system 1400 that can be utilized to implement aspects of the various methods and systems presented herein, according to particular embodiments. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example, and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example, and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example, and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example, and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example, and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example, and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "member," "module," "device," "unit," "component," "element," "mechanism," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

The invention claimed is:

1. A system comprising:
one or more memory units configured to store outbound train schedule data; and
one or more computer processors communicatively coupled to the one or more memory units and configured to execute computer program instructions, wherein the configuration of the one or more computer processors to execute the computer program instructions includes configuration to spawn a first computer process configured to execute a first set of computer program instructions including instructions to implement one or more of at least a portion of a first optimization model and at last a portion of a second optimization model, and to spawn a second computer process configured to execute a second set of computer program instructions including instructions to implement one or more of the at least a portion of the first optimization model and the at last a portion of the second optimization model, wherein the first computer process and the second computer process are spawned concurrently, wherein the one or more computer processors is further configured to execute the computer program instructions to:
access the outbound train schedule data;
determine, using the first optimization model and the outbound train schedule data, a first list of train block assignments for a planning horizon;
after determining the first list of train block assignments using the first optimization model, determine whether an unassigned train block volume from the first optimization model is greater than zero, wherein the unassigned train block volume from the first optimization model indicates a number of train blocks that remain unassigned to a classification track after using the first optimization model to determine the first list of train block assignments;
in response to determining that the unassigned train block volume from the first optimization model is not greater than zero, display the first list of train block assignments generated by the first optimization model on an electronic display;
in response to determining that the unassigned train block volume from the first optimization model is greater than zero:
determine, using the second optimization model and the outbound train schedule data, a second list of train block assignments for the planning horizon; and
display the second list of train block assignments generated by the second optimization model on the electronic display;
wherein the first and second lists of train block assignments each comprise:
a plurality of classification tracks of a classification bowl;
a plurality of time periods of the planning horizon; and
one or more of a plurality of train blocks that are assigned to each classification track for each time period of the planning horizon.

2. The system of claim 1, wherein:
the first optimization model is configured to assign a maximum of one train block of the plurality of train blocks per classification track; and
the second optimization model is configured to assign a maximum of two train blocks of the plurality of train blocks per classification track.

3. The system of claim 1, the one or more computer processors further configured to:
after determining the second list of train block assignments using the second optimization model, determine whether an unassigned train block volume from the second optimization model is greater than zero;
in response to determining that the unassigned train block volume from the second optimization model is greater than zero, determine, using a third optimization model and the outbound train schedule data, a third list of train block assignments for the planning horizon;
after determining the third list of train block assignments using the third optimization model, determine whether an unassigned train block volume from the third optimization model is greater than zero; and
in response to determining that the unassigned train block volume from the third optimization model is greater than zero, determine, using a fourth optimization model and the outbound train schedule data, a fourth list of train block assignments for the planning horizon;
wherein the third optimization model is configured to:
assign a maximum of two train blocks of the plurality of train blocks per classification track; and
minimize the unassigned train block volume from the third optimization model; and
wherein the fourth optimization model is configured to:
assign a maximum of two train blocks of the plurality of train blocks per classification track; and
allow for suboptimal stacking decisions over the third optimization model.

4. The system of claim 1, wherein the plurality of time periods are one-hour blocks of time.

5. The system of claim 1, wherein the outbound train schedule data comprises:
a plurality of outbound train identifications;
a build time for each of the outbound train identifications;
a depart time for each of the outbound train identifications; and
a maximum train length for each of the outbound train identifications.

6. The system of claim 1, wherein the first and second optimization models each:
minimize an amount of the unassigned train block volume for the classification bowl;
minimize switch distances by minimizing distances between common train block belonging to a same outbound train; and
minimize a total number of outbound trains present in multiple pull-leads.

7. The system of claim 1, the one or more computer processors further configured to display, on the electronic display, a bar chart for each classification track of the plurality of classification tracks, the bar chart comprising:
an x-axis that corresponds to the plurality of time periods of the planning horizon; and
a y-axis that corresponds to assigned volumes of the one or more train blocks.

8. A method by a computing system for assigning train blocks at a railroad merchandise yard, the computing system including one or more processors configured to execute computer program instructions, the method comprising:
spawning a first computer process configured to execute a first set of computer program instructions including instructions to implement one or more of at least a portion of a first optimization model and at last a portion of a second optimization model;
spawning, concurrently with the spawning of the first computer process, a second computer process configured to execute a second set of computer program instructions including instructions to implement one or more of the at least a portion of the first optimization model and the at last a portion of the second optimization model;
accessing outbound train schedule data;
determining, using the first optimization model and the outbound train schedule data, a first list of train block assignments for a planning horizon;
after determining the first list of train block assignments using the first optimization model, determining whether an unassigned train block volume from the first optimization model is greater than zero, wherein the unassigned train block volume from the first optimization model indicates a number of train blocks that remain unassigned to a classification track after using the first optimization model to determine the first list of train block assignments;
in response to determining that the unassigned train block volume from the first optimization model is not greater than zero, displaying the first list of train block assignments generated by the first optimization model on an electronic display;
in response to determining that the unassigned train block volume from the first optimization model is greater than zero:
determining, using the second optimization model and the outbound train schedule data, a second list of train block assignments for the planning horizon; and
displaying the second list of train block assignments generated by the second optimization model on the electronic display;
wherein the first and second lists of train block assignments each comprise:
a plurality of classification tracks of a classification bowl;
a plurality of time periods of the planning horizon; and
one or more of a plurality of train blocks that are assigned to each classification track for each time period of the planning horizon.

9. The method of claim 8, wherein:
the first optimization model is configured to assign a maximum of one train block of the plurality of train blocks per classification track; and
the second optimization model is configured to assign a maximum of two train blocks of the plurality of train blocks per classification track.

10. The method of claim 8, further comprising:
after determining the second list of train block assignments using the second optimization model, determining whether an unassigned train block volume from the second optimization model is greater than zero;
in response to determining that the unassigned train block volume from the second optimization model is greater than zero, determining, using a third optimization model and the outbound train schedule data, a third list of train block assignments for the planning horizon;
after determining the third list of train block assignments using the third optimization model, determining whether an unassigned train block volume from the third optimization model is greater than zero; and
in response to determining that the unassigned train block volume from the third optimization model is greater than zero, determining, using a fourth optimization model and the outbound train schedule data, a fourth list of train block assignments for the planning horizon;
wherein the third optimization model is configured to:
assign a maximum of two train blocks of the plurality of train blocks per classification track; and
minimize the unassigned train block volume from the third optimization model; and
wherein the fourth optimization model is configured to:
assign a maximum of two train blocks of the plurality of train blocks per classification track; and
allow for suboptimal stacking decisions over the third optimization model.

11. The method of claim 8, wherein the plurality of time periods are one-hour blocks of time.

12. The method of claim 8, wherein the outbound train schedule data comprises:
a plurality of outbound train identifications;
a build time for each of the outbound train identifications;
a depart time for each of the outbound train identifications; and
a maximum train length for each of the outbound train identifications.

13. The method of claim 8, wherein the first and second optimization models each:
minimize an amount of the unassigned train block volume for the classification bowl;
minimize switch distances by minimizing distances between common train block belonging to a same outbound train; and
minimize a total number of outbound trains present in multiple pull-leads.

14. The method of claim 8, further comprising displaying, on the electronic display, a bar chart for each classification track of the plurality of classification tracks, the bar chart comprising:
an x-axis that corresponds to the plurality of time periods of the planning horizon; and
a y-axis that corresponds to assigned volumes of the one or more train blocks.

15. One or more computer-readable non-transitory storage media embodying instructions that, when executed by a processor, cause the processor to spawn a first computer process configured to execute a first set of computer program instructions including instructions to implement one or more of at least a portion of a first optimization model and at last a portion of a second optimization model, and to spawn a second computer process configured to execute a second set of computer program instructions including instructions to implement one or more of the at least a portion of the first optimization model and the at last a portion of the second optimization model, wherein the first computer process and the second computer process are spawned concurrently, and wherein operations of the first set of operations and the second set of operations include:
accessing outbound train schedule data;
determining, using the first optimization model and the outbound train schedule data, a first list of train block assignments for a planning horizon;
after determining the first list of train block assignments using the first optimization model, determining whether an unassigned train block volume from the first optimization model is greater than zero, wherein the unassigned train block volume from the first optimization model indicates a number of train blocks that remain unassigned to a classification track after using the first optimization model to determine the first list of train block assignments;

in response to determining that the unassigned train block volume from the first optimization model is not greater than zero, displaying the first list of train block assignments generated by the first optimization model on an electronic display;

in response to determining that the unassigned train block volume from the first optimization model is greater than zero:
  determining, using the second optimization model and the outbound train schedule data, a second list of train block assignments for the planning horizon; and
  displaying the second list of train block assignments generated by the second optimization model on the electronic display;

wherein the first and second lists of train block assignments each comprise:
  a plurality of classification tracks of a classification bowl;
  a plurality of time periods of the planning horizon; and
  one or more of a plurality of train blocks that are assigned to each classification track for each time period of the planning horizon.

16. The one or more computer-readable non-transitory storage media of claim 15, wherein:
  the first optimization model is configured to assign a maximum of one train block of the plurality of train blocks per classification track; and
  the second optimization model is configured to assign a maximum of two train blocks of the plurality of train blocks per classification track.

17. The one or more computer-readable non-transitory storage media of claim 15, the operations further comprising:
  after determining the second list of train block assignments using the second optimization model, determining whether an unassigned train block volume from the second optimization model is greater than zero;
  in response to determining that the unassigned train block volume from the second optimization model is greater than zero, determining, using a third optimization model and the outbound train schedule data, a third list of train block assignments for the planning horizon;
  after determining the third list of train block assignments using the third optimization model, determining whether an unassigned train block volume from the third optimization model is greater than zero; and
  in response to determining that the unassigned train block volume from the third optimization model is greater than zero, determining, using a fourth optimization model and the outbound train schedule data, a fourth list of train block assignments for the planning horizon;
  wherein the third optimization model is configured to:
    assign a maximum of two train blocks of the plurality of train blocks per classification track; and
    minimize the unassigned train block volume from the third optimization model; and
  wherein the fourth optimization model is configured to:
    assign a maximum of two train blocks of the plurality of train blocks per classification track; and
    allow for suboptimal stacking decisions over the third optimization model.

18. The one or more computer-readable non-transitory storage media of claim 15, wherein the outbound train schedule data comprises:
  a plurality of outbound train identifications;
  a build time for each of the outbound train identifications;
  a depart time for each of the outbound train identifications; and
  a maximum train length for each of the outbound train identifications.

19. The one or more computer-readable non-transitory storage media of claim 15, wherein the first and second optimization models each:
  minimize an amount of the unassigned train block volume for the classification bowl;
  minimize switch distances by minimizing distances between common train block belonging to a same outbound train; and
  minimize a total number of outbound trains present in multiple pull-leads.

20. The one or more computer-readable non-transitory storage media of claim 15, the operations further comprising displaying, on the electronic display, a bar chart for each classification track of the plurality of classification tracks, the bar chart comprising:
  an x-axis that corresponds to the plurality of time periods of the planning horizon; and a y-axis that corresponds to assigned volumes of the one or more train blocks.

* * * * *